United States Patent
Di Gregorio et al.

(10) Patent No.: US 12,481,593 B1
(45) Date of Patent: Nov. 25, 2025

(54) METHOD AND APPARATUS FOR REDUCTION OF RECURRING CACHE MISSES

(71) Applicant: Arm Limited, Cambridge (GB)

(72) Inventors: Lorenzo Di Gregorio, Munich (DE); Andrew David Tune, Dronfield (GB)

(73) Assignee: Arm Limited, Cambridge (GB)

( * ) Notice: Subject to any disclaimer, the term of this patent is extended or adjusted under 35 U.S.C. 154(b) by 5 days.

(21) Appl. No.: 18/673,544

(22) Filed: May 24, 2024

(51) Int. Cl.
*G06F 12/00* (2006.01)
*G06F 11/34* (2006.01)
*G06F 12/08* (2016.01)
*G06F 12/0811* (2016.01)
*G06F 12/0864* (2016.01)
*G06F 12/0875* (2016.01)
*G06F 12/0888* (2016.01)
*G06F 12/1009* (2016.01)
*G06F 12/0802* (2016.01)

(52) U.S. Cl.
CPC ...... *G06F 12/0888* (2013.01); *G06F 11/3471* (2013.01); *G06F 12/08* (2013.01); *G06F 12/0811* (2013.01); *G06F 12/0864* (2013.01); *G06F 12/0875* (2013.01); *G06F 12/1009* (2013.01); *G06F 12/0802* (2013.01)

(58) Field of Classification Search
CPC ............ G06F 12/0888; G06F 12/0875; G06F 12/0811; G06F 12/0864; G06F 12/08; G06F 12/0802; G06F 11/3471; G06F 12/1009; G06F 12/1027

USPC ........................................................ 711/138
See application file for complete search history.

(56) References Cited

U.S. PATENT DOCUMENTS

| | | | |
|---|---|---|---|
| 11,397,685 B1* | 7/2022 | Ishii | G06F 12/0864 |
| 11,467,960 B1* | 10/2022 | Dimond | G06F 11/3037 |
| 2024/0211405 A1* | 6/2024 | Srivastava | G06F 11/3636 |
| 2024/0354216 A1* | 10/2024 | Evans | G06F 12/1027 |

OTHER PUBLICATIONS

Alon et al., "The Space Complexity of Approximating the Frequency Moments," Journal of Computer and Systems Sciences, vol. 50, Issue 1, pp. 137-147, Feb. 1999.

(Continued)

*Primary Examiner* — Mardochee Chery
(74) *Attorney, Agent, or Firm* — Leveque Intellectual Property Law, P.C.

(57) ABSTRACT

A control circuit is configured to receive a stream of addresses associated with cache lookup requests resulting from execution of a workload by a data processing system. The control circuit includes a cache miss monitor and a cache hit monitor both coupled to a controller. The cache miss monitor determines a number of reoccurring misses as a difference between the number of addresses in the stream of addresses that miss in the cache and the number of such addresses that are unique. The cache hit monitor includes a moment circuit configured to determine first and second frequency moments addresses in the stream of addresses that hit in the cache. The controller controls the data processing system based on the number of reoccurring misses and the first and second frequency moments. A bypass mechanism of the cache may be controlled, for example.

20 Claims, 11 Drawing Sheets

(56) References Cited

OTHER PUBLICATIONS

Beckmann et al., "Scaling distributed cache hierarchies through computation and data co-scheduling," IEEE 21st International Symposium on High Performance Computer Architecture (HPCA), Burlingame, CA, USA, pp. 538-550, 2015.
Beckmann et al., "Talus: A Simple Way to Remove Cliffs in Cache Performance," 2015 IEEE 21st International Symposium on High Performance Computer Architecture (HPCA), Burlingame, CA, pp. 64-75, 2015.
Carta, David G., "Park-Miller-Carta Pseudo-Random Number Generator," https://www.firstpr.com.au/dsp/rand31/, 2005.
Doumas et al., "The coupon collector's problem revisited: generalizing the double Dixie cup problem of Newman and Shepp," ESAIM: Probability and Statistics, vol. 20, pp. 367-399, 2016.
Flajolet et al., "HyperLogLog: the analysis of a near-optimal cardinality estimation algorithm," Discrete Mathematics and Theoretical Computer Science (DMTCS), Nancy, France, AH: 127-146, 2007.
Heule et al., "HyperLogLog in Practice: Algorithmic Engineering of a State of the Art Cardinality Estimation Algorithm," EDBT/ICDT '13 Mar. 18-22, 2013, Genoa, Italy.
Misra et al., "Finding Repeated Elements," Science of Computer Programming, 2(2): pp. 143-152, 1982.
Qureshi et al., "Utility-Based Cache Partitioning: A Low-Overhead, High-Performance, Runtime Mechanism to Partition Shared Caches, " 39th Annual IEEE/ACM International Symposium on Microarchitecture (MICRO '06), pp. 423-432, 2006.
Wikipedia.org, "Newton-Raphson-Division," https://en.wikipedia.org/w/index.php?title=Division_algorithm&action=history&dir=prev, 2005.

* cited by examiner

```python
class AMS():
    def __init__(self,
                 counters          = 64,
                 sampling_distance = 1024*2):
        self.COUNTERS         = counters
        self.SAMPLING_DISTANCE = sampling_distance
        self.F1_counters      = dict()
        self.F1_accumulator   = 0
        self.F2_accumulator   = 0
        self.frequency_samples = 0
        self.rng              = np.random.default_rng(1387)
        return def update(self, adr):
        new_sample = False
        if adr in self.F1_counters:
            if len(self.F1_counters) >= self.COUNTERS and
self.rng.integers(self.SAMPLING_DISTANCE, endpoint=True) < self.COUNTERS:
                self.F1_counters[adr]  = 1
                self.frequency_samples += 1
                new_sample = True
            else:
                self.F1_counters[adr] += 1
                self.F2_accumulator += 2*self.F1_counters[adr]-1
                self.F1_accumulator += 1
        else:
            if len(self.F1_counters) >= self.COUNTERS and
self.rng.integers(self.SAMPLING_DISTANCE, endpoint=True) < self.COUNTERS:
                remove = self.rng.choice(list(self.F1_counters.keys()))
                del self.F1_counters[remove]
            if len(self.F1_counters) < self.COUNTERS:
                self.F1_counters[adr]  = 1
                self.frequency_samples += 1
                new_sample = True
                self.F2_accumulator   += 2*self.F1_counters[adr]-1
                self.F1_accumulator   += 1
        return new_sample def mean(self):
        return self.F1_accumulator/self.frequency_samples def variance(self, distance = None):
        return self.second_moment() - self.mean()**2 def second_moment(self, distance = None):
        return self.F2_accumulator/self.frequency_samples
```

*FIG. 10*

METHOD AND APPARATUS FOR REDUCTION OF RECURRING CACHE MISSES

BACKGROUND

Data processors often access memory with a degree of temporal or spatial proximity. Performance can be improved by storing recently accessed data in a small, fast memory called a cache. A cache hit occurs when requested data is present in a cache, while a cache miss occurs when it is not. Data is read from the cache when a cache hit occurs and is retrieved from a data store when a miss occurs.

Cache misses are classified as cold or warm misses. A cold miss allocates a block or line in the cache for a memory block that has not been accessed previously, within some reasonable time. Cold misses are unavoidable because data currently in use, referred to as the working set, must be moved into the cache when first accessed. In contrast, a warm miss allocates a memory block which has been evicted by the cache. A warm miss an indication that the cache should have retained that block, but the block was evicted before being used. Eviction of a block may occur, for example, when the cache set in which the block was allocated does not have sufficient capacity.

A phenomenon referred to as "cache thrashing" occurs when one or more memory blocks are repeatedly evicted only to be allocated again in future. In other words, the cache miss is "recurring." Cache thrashing is known to be detrimental for performance and power consumption.

BRIEF DESCRIPTION OF THE DRAWINGS

The accompanying drawings provide visual representations which will be used to describe various representative embodiments more fully and can be used by those skilled in the art to understand better the representative embodiments disclosed and their inherent advantages. In these drawings, like reference numerals identify corresponding or analogous elements.

FIG. 10 is program of computer instructions for updating CAM elements in a hit monitor, in accordance with various representative embodiments.

DETAILED DESCRIPTION

Figure 1:
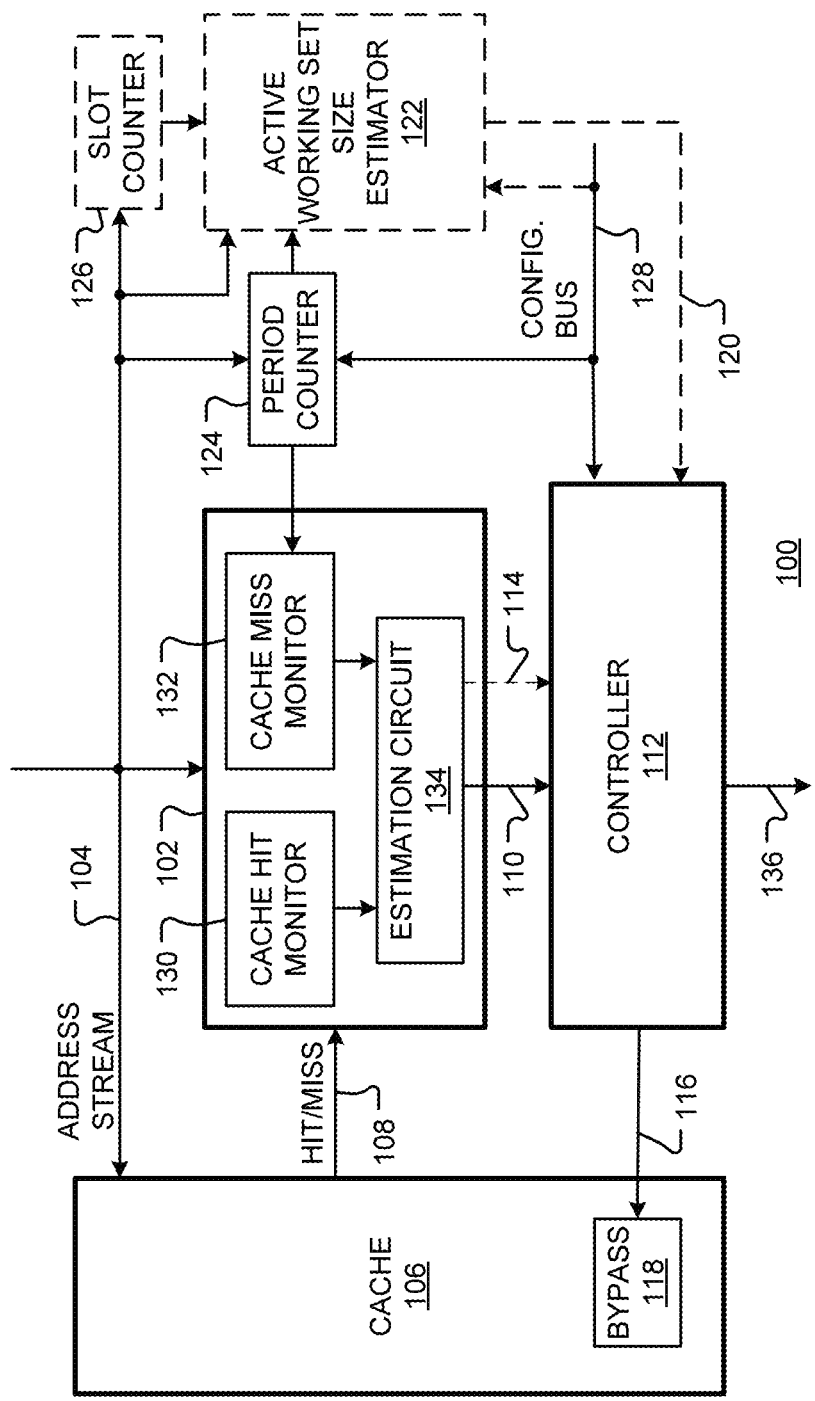
FIG. 1 is a simplified block diagram of a data cache and control circuit of a data processing system, in accordance with various representative embodiments.

The various apparatus and devices described herein provide mechanisms for reducing recurring cache misses in a data processing system.

While this present disclosure is susceptible of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements.

The present disclosure describes a hardware architecture that monitor performance of a cache and produces an indicator of the likelihood of cache thrashing. This indicator may be used as a cache bypass factor, for example.

The following informal definitions relate to a stream of addresses, which might be addresses requested to the cache or addresses missed or hit by the cache.

Active working set size. A "working set" in the context of this document is the set of addresses visited one or more times by a stream of addresses. This set is also referred to as the "visited working set" or the "referenced working set." For example, if the sequence of addresses (1, 2, 0, 3, 1, 0, 3) is visited, then the working set consists of the addresses $\{0, 1, 2, 3\}$, which have been visited one or more times. The number of addresses in the working set is referred to as the "cardinality" of the working set, which is four in this example. The "active working set" consists of addresses visited more than once by the stream of addresses. In the previous example, the address 2 has been visited only once, so the active working set consists of $\{0, 1, 3\}$ and has cardinality three. If address 2 were stored in the cache it would be a "dead block," because it will not be referenced again by a stream of requested addresses. Thus, address 2 could be bypassed or evicted immediately without increasing the miss rate of affecting performance.

Frequency. The number of references to a specific data block in a sequence is called the "frequency" of the block. The ratio of frequency to the number of references to all data blocks of an underlying set is referred to as the "temperature" of the block. For example, in the sequence of addresses (1, 0, 2, 1, 0, 1, 3), address 0 has a frequency of 2 and a temperature of 2/7, while address 1 has a frequency of three and a temperature of 3/7. In cache terminology, temperature is a common metaphor, used in terms such as "cold misses," "warm-up phases," "warm caches" and "hot spots." The temperature of a working set is the distribution of temperatures of items of the underlying working set: in the previous example the temperature distribution is $\{3/7, 2/7, 1/7, 1/7\}$ and the average temperature is the nominal one of $(3/7+2/7+1/7+1/7)/4=1/4$. The temperature of a subset of the working set is the temperature distribution of items in this subset as obtained from the underlying working set, so in the previous example the subset of addresses $\{0, 1\}$ has a temperature distribution of {3/7, 2/7} and an average temperature of (3/7+2/7)/2=2.5/7.

Frequency Moments

The number of occurrences of address a in a block of addresses of an address stream is denoted as frequency $f_a$. The first frequency moment for a set A of n addresses is defined as:

$$\mu = M^{(1)} \triangleq 1/n \Sigma_{a \in A} f_a.$$

The address set A may contain all addresses in the block or a subset of addresses in the block. The first frequency moment is the average number of occurrences of an address in the block.

The second frequency moment is defined as:

$$M^{(2)} \triangleq 1/n \Sigma_{a \in A} f_a^2.$$

Again, the address set A may contain all addresses in the block or a subset of addresses in the block.

Warm misses. A miss on a block previously evicted from the cache is called a "warm" miss, because the block had been already allocated at least once during "cache warmup." Cache warm-up is the phase of operation during which unavoidable misses, also known as "cold" misses, are the dominant share of all cache misses. Warm misses are caused by a part of the active working set having been evicted from the cache.

For example, the stream of 10 missed addresses (0, 1, 2, 1, 3, 3, 4, 3, 5, 1) has 4 warm misses (to address 1 and 3), and a cold miss set of {0, 1, 2, 3, 4, 5} with cardinality 6.

Conflict Miss. A miss that occurs after a block was evicted from the cache because the cache set in which it was allocated did not have sufficient capacity—even though the cache as a whole had sufficient capacity to hold the working data set.

Reoccurring misses. A miss that has occurred previously in a stream of misses is called a reoccurring miss. For a cache, a reoccurring miss is a warm miss. However, a miss seen for the first time at a monitor circuit is not a warm miss-even if it results from a warm miss in the cache.

Decimation. A decimation is a specification of which addresses should be selected to bypass allocation in the cache. Within this specification the decimation is opportunistic: if a memory block has been cached, a decimation of its address will not cause its deallocation. The decimation can be applied to addresses being requested to the cache, for cache lookups, or to addresses being requested by the cache, on cache misses. A decimation by a bypass factor of 1/n means that one in every n addresses is bypassed. However, the notion of decimation per se does not imply that these addresses must be sparse: a decimation is valid also if the software decides to define some data structures as un-cached to achieve the target bypass factor. In addition, this definition does not imply also that the decimated set of addresses is stationary. If the decimation is applied to addresses requested to the cache it, it is defined as stationary because randomness would degrade the performance. However, if the decimation is applied to missed addresses, there may be good reasons to define a random decimation.

Embodiments of the present disclosure include a control circuit and a method of operation thereof for reducing cache misses that are likely to cause cache thrashing in a data processing system. A cache is arranged as a number of cache sets. Each cache set can store one or more data blocks. A data block may be 64 bytes, for example, or another size. Cache thrashing occurs when cache sets are oversubscribed, so that allocations repeatedly evict each other cache blocks before they are used. A control circuit is disclosed that determines a cache-thrashing indicator that estimates the probability that a cache miss will cause cache thrashing. Countermeasures to cache-thrashing may be adopted based on this indicator. For example, the cache may be bypassed for some portion of the address space, where the portion of addresses bypassed is based on a bypass factor. The addresses to be bypassed may be selected at random. In a further embodiment, selected data structures are not cached. In a still further embodiment, a hashing function used for determining cache allocations is selected from a range of hashing functions based on a bypass factor.

The cache bypass factor may be force-directed, in that the probability of repeating misses applies a force to the bypass factor to increase bypassing misses, and the probability of allocation applies a force to the bypass factor to decrease bypassing misses.

Misses to be bypassed can be decimated randomly or by user control. This force-directed control of the bypass factor provides a feedback mechanism for controlling cache misses during execution of a workload and thus the bypass factor adapts to fluctuating workloads. The disclosed hardware architecture can be used with any cache design.

Conventional approaches to workload optimization consist of various offline analyses leading to static modifications of the system. These static modifications aim to achieve some higher average performance. These approaches require the development of offline analysis infrastructures and have limited effectiveness since they neglect the dynamic behavior of the workload.

In order to reduce conflict misses, the workload must be subscribed less to the cache sets. This may be done either by bypassing on misses or by bypassing on accesses. When bypassing on misses, when a miss occurs, it is bypassed with a certain probability. The rationale behind this policy is that when cache set is oversubscribed some misses must bypass the cache to prevent thrashing it. When bypassing on accesses, a set of addresses is defined as "un-cached." If an un-cached address is hit in the cache, the cache will respond, but if it is not hit, then the miss is bypassed, and no space is allocated in the cache. The rationale behind this policy is that conflict misses are capacity misses because the whole cache is oversubscribed.

An embodiment of the disclosure supports "bypassing on misses." Bypassing on misses does not presume that the cache is oversubscribed. The bypass probability is increased when conflict misses occur and there is little free capacity among dead blocks. In this event, there is little benefit in evicting data from the cache. Conversely, "bypassing on accesses" checks that the cache as whole is not oversubscribed by reducing the working set seen by the cache. It is possible for a cache to be subject to a workload with a small working set causing several conflicts, or to a workload with large working set causing conflicts due to limited cache capacity, or both.

For example, in a simple full-associative, single-way cache of capacity 4 for which a cache block comprises 4 addresses, the sequence of addresses 2, 6, 2, 6, 2, 6, 2, 6 has a working set of size 2 but causes 100% of conflicts (neglecting the first access). The first access loads addresses 1-4 (one block), the next access evicts addresses 1-4 and loads address 5-8. This process repeats so there are no cache hits. In contrast, the sequence 1, 2, 3, 4, 5, 6, 7, 8 exceeds the cache capacity by 100% but causes 50% of conflicts. Accesses to addresses 2, 3, 4, 6, 7, 8 produce cache hits. Both techniques for bypassing on misses and accesses can be combined to fit a working set into a smaller cache and remove conflict misses.

As a first approximation, the probability that a cache miss will be a cache-thrashing conflict miss may be estimated as the share of all cache misses that are not cold misses. Then, the probability of cache-thrashing will be less than 1−(cold misses/total misses). True cache thrashing would occur if the evicted block were referenced again in the future.

Cache replacement policies already attempt to predict which blocks will be re-referenced. An embodiment of the present disclosure estimates the share of the cached memory blocks is either "dead" (i.e., not re-referenced in future) or referenced significantly less frequently than the memory blocks being missed. The estimated probability of cache-thrashing is balanced by an increase driven by estimated conflict misses and a decrease driven by having seen under-subscription of the occupied cache. More specifically, the disclosed mechanism estimates the probability that an average conflict miss is less frequent than an average hit and lets it allocate in its place. Since the mechanism operates on top of an existing cache system, the probability of allocation is increased.

Various embodiments provide a control circuit configured to receive a stream of addresses associated with cache lookup requests to a cache of a data processing system, the requests resulting from execution of a workload by the data processing system. The control circuit includes a cache miss monitor and a cache hit monitor coupled to a controller. The cache miss monitor includes a first counter configured to determine a number of addresses in the stream of addresses for which a corresponding lookup request resulted in a miss in the cache, a cardinality circuit configured to determine a number of unique addresses in the stream of addresses for which a corresponding lookup request resulted in a miss in the cache, and a circuit configured to determine a number of reoccurring misses as a difference between the number of addresses and the number of unique addresses. The cache hit monitor includes a moment circuit configured to determine a first frequency moment $\mu h$ and a second frequency moment $M_h^{(2)}$ of addresses in the stream of addresses for which a corresponding lookup request resulted in a hit in the cache. The controller is configured to control the data processing system based on the number of reoccurring misses, the first frequency moment $\mu_h$ and the second frequency moment $M_h^{(2)}$. The first frequency moment $\mu_h$ may be determined from the stream of addresses. The second frequency moment $M_h^{(2)}$ may be determined wither from the stream of addresses or from the first frequency moment and a variance parameter $\sigma_h^2$.

In one embodiment, the cardinality circuit includes a circuit, such as a HyperLogLog circuit, configured to determine a statistical estimate of the number of unique addresses in a block of addresses of the stream of addresses. Other cardinality circuits may be used without departing from the present disclosure.

In one embodiment, the moment circuit is configured to determine statistical estimates of the first and second frequency moments over blocks of addresses of the stream of addresses.

In one embodiment, the cache hit monitor includes an allocation circuit configured to allocate one or more addresses of the stream of addresses in a memory, a second counter configured to count a number of addresses in the stream of addresses for which the address matches an address allocated in the memory and a corresponding lookup request resulted in a hit in the cache, and a third counter configured count a number of allocations made by the allocation circuit.

In one embodiment, the control circuit includes an estimation circuit configured to determine a cache-thrashing indicator based on the number of reoccurring misses, the first frequency moment $\mu h$ and the second frequency moment $M_h^{(2)}$. The controller is configured to control the data processing system based on the cache-thrashing indicator. The control circuit may include a cache bypass circuit configured to randomly bypass the cache for a cache miss with a probability based on the cache-thrashing indicator, bypass the cache for a cache miss for a data address based on the data address and the cache-thrashing indicator, or bypass the cache for a cache miss for a data address based on a hash of the data address and the cache-thrashing indicator. The cache-thrashing indicator may also be based on a ratio W/T, where T is the number of addresses in the stream of addresses for which a corresponding lookup request resulted in a miss in the cache and W is the number of reoccurring misses in the address stream.

The control circuit may also include a working set size estimator configured to monitor the address stream and generate a statistical estimate of a size of a working set of the cache. In this embodiment, the controller is further configured to control a bypass mechanism of the cache to bypass allocations in the cache based on the number of reoccurring misses, the first frequency moment $\mu_h$ and the second frequency moment $M_h^{(2)}$, and bypass the cache based on the statistical estimate of the size of the working set of the cache.

The cache hit monitor may include a memory, a replacement circuit, a memory update circuit and an accumulator update circuit. The memory is configured to store a set of R frequency counts, where a frequency count c(i) at location i in the memory is associated with an address a(i) in a set of addresses selected from the stream of addresses. The replacement circuit is configured to replace an address in the set of addresses with a current address in the stream of addresses based on a designated probability, and set frequency count c(i) to one when the address associated with frequency count c(i) addresses is replaced. The memory update circuit is configured to increment the frequency count c(i) stored in the memory when an associated addresses a(i) in the set of addresses occurs in the stream of cache lookup addresses and a corresponding cache lookup is a miss in the cache. The accumulator update circuit is configured to update one or more accumulator values based on the frequency counts. In this embodiment, the moment circuit is configured to determine the first and second frequency moments based on the accumulated values.

The accumulator update circuit may be configured to increment a first accumulator value $F_1$, and add $2 \times c(i) - 1$ to a second accumulator value $F_2$ when an address a(i) in the set of addresses occurs in the stream of cache lookup addresses and the corresponding cache lookup is a miss in the cache. The accumulator update circuit increments a sample accumulator value $F_0$ when an address in the set of addresses is replaced. The second frequency moment $M_h^{(2)}$ of the address stream may be determines as: $F_2/F_0$.

The memory may include a content address memory (CAM) configured to store the set of addresses, the CAM determining an index i in response to an address a(i).

In one embodiment, the cardinality circuit includes a memory, configured to store maximum pattern lengths, together with match circuitry, memory update circuitry, sum update circuitry and sequential logic circuitry, The memory circuitry is configured to generate a first pattern match length of a first bit vector, the first bit vector corresponding to an address of the stream of addresses or a hash of an address of the stream of addresses. The memory update circuitry is configured to receive a first index, compare the first pattern match length to a maximum pattern length for the first index stored in the memory, and update and the maximum pattern match length for the first index in the memory with the first pattern match length when the first pattern match length is greater than the maximum pattern length for the first index. The sum update circuitry is configured to update a first summation value based on the maximum pattern match length for the first index and the first pattern match length when the first pattern match length is greater than the maximum pattern length for the first index. The sequential logic circuitry is configured to generate a first statistical cardinality count from a scaled reciprocal of the first summation, the first statistical cardinality count indicating number of unique addresses in the stream of addresses for which a corresponding lookup request resulted in a miss in the cache.

Hash circuitry may be used to generate a hash value from an address of the stream of addresses, the hash value including the first index and the first bit vector.

The controller is configured to control a bypass mechanism of the cache, a partitioning of the cache, or an allocation of the workload.

Computer-readable code for fabrication of the control circuit may be stored on a non-transitory computer-readable medium.

Various embodiment relate to a computer-implemented method for monitoring. a sequence of cache requests in a data processing system having a cache, where the sequence of cache requests result from execution of a workload by the data processing system.

The method includes determining an average reoccurring miss frequency $\mu_m$ of addresses in the sequence of cache requests based on a total number of addresses in the sequence and a number of unique addresses in the sequence, determining a first frequency moment $\mu_h$ and a second frequency moment $M_h^{(2)}$ of sample addresses in the sequence of the cache requests that resulted in a hit in the cache, and controlling the data processing system based on the average reoccurring miss frequency $\mu_m$, the first frequency moment $\mu_h$ and the second frequency moment $M_h^{(2)}$.

Determining the average reoccurring miss frequency $\mu_m$ may include estimating an average number of misses between new reoccurring misses, and determining the average reoccurring miss frequency $\mu_m$ as a function of the average number of misses between new reoccurring misses.

The method of may also include increasing a cache-thrashing indicator based on the average reoccurring miss frequency $\mu_m$ and decreasing the cache-thrashing indicator based on the first frequency moment $\mu_h$ and a second frequency moment $M_h^{(2)}$. The cache-thrashing indicator may be used to control, for example, a bypass mechanism of the cache, a partitioning of the cache, and/or allocation of the workload. Decreasing the cache-thrashing indicator based on the first frequency moment $\mu_h$ and the second frequency moment $M_h^{(2)}$ may include determining a probability that a reoccurring miss can be allocated in the cache in place of a low activity or dead cache block.

The bypass mechanism may include randomly bypassing the cache for a cache miss with a probability based on the cache-thrashing indicator, bypassing the cache for a cache miss for a data address based on the data address and the cache-thrashing indicator, and/or bypassing the cache for a cache miss for a data address based on a hash of the data address and the cache-thrashing indicator. Herein, the terms "random" and "randomly" are taken as including "pseudo-random" and "pseudo-randomly," respectively.

Control Circuit for Cache-Thrashing Control

FIG. 1 is a simplified block diagram of a data cache and control circuit of a data processing system 100, in accordance with various representative embodiments. Control circuit 102 is hardware module operable to monitor address stream 104 associated with lookup requests to cache 106. Control circuit 102 also receives a stream of hit/miss indicators 108 from cache 106, indicating whether a cache lookup request resulted in a hit or a miss in cache 106. Based on address stream 104 and hit/miss indicators 108, control circuit 102 produces cache-thrashing indicator 110 that is coupled to controller 112. Controller 112 is configured to adjust operation of the data processing system based on cache-thrashing indicator 110. Optionally, control circuit 102 may generate one or more additional or alternative outputs 114 to the controller, such as the hit and miss statistics, from which cache-thrashing indicator 110 is generated.

In one embodiment, controller 112 produces bypass control signal 116 that configures bypass circuit 118 of cache 106. Bypassing some cache misses, rather than allocating blocks in the cache, can reduce the probability of cache-thrashing.

In one embodiment, controller 112 is also responsive to signal 120 from active working set size estimator 122. Active working set size estimator 122 is a circuit that monitors address stream 104 and generates a statistical estimate of the size of the working set. Active working set size estimator 122 also uses the values of period counter 124 and slot counter 126, which count elements in the address stream to identify intervals and subintervals, as discussed below.

Configuration bus 128 carries signals to set the configuration parameters of control circuit 102 and controller 112.

In one embodiment, control circuit 102 includes cache hit monitor 130 and cache miss monitor 132. Cache hit monitor 130 is an electronic circuit that generates statistical estimates of the first and second moments of hit frequencies in a block of lookup requests, These moments are related to the frequency and variance of cache hits. Cache miss monitor 132 is an electronic circuit that generates statistical estimates of the reoccurring miss frequency—i.e., the average number of reoccurring misses in a block of lookup requests.

Estimation circuit 134 generates cache-thrashing indicator 136, based on the average frequency and variance of cache hits from cache hit monitor 130 and the frequency of reoccurring cache misses from cache miss monitor 132. This is discussed in more detail below.

In order to reduce cache-thrashing, controller 112 may control one or more aspects of the data processing system. For example, based on the cache-thrashing indicator 110, the controller may control a bypass mechanism of the cache, a partitioning of the cache, or allocation of the workload. This is indicated by control signal 136.

HyperLogLog and AMS

In some embodiments of the disclosure, cache miss monitor 132 uses a statistical data processing mechanism, known as a "HyperLogLog" cardinality estimator, to estimate the number of reoccurring misses and hit monitor 130 uses a statistical data processing mechanism known as the Alon-Matias-Szegedy ("AMS") technique to estimate the mean frequency and variance of cache hits for an average cache line. In other embodiments, the mean frequency and variance of cache hits for an average cache line are obtained by averaging over frequency samples. These estimates are combined in estimation circuit 134 to provide cache-thrashing indicator 136 that relates to the probability of cache-thrashing. In turn, the cache-thrashing indicator can be utilized by a user control or by feedback controller 112 to drive methods to let some misses bypass the cache. While this indicator provides an estimation that is coarse in comparison to the errors seen in the individual estimates, it is sufficient in practice to provide force-directed feedback control of cache bypass mechanism 118. Other statistical estimators may be used in cache hit monitor 130 or cache miss monitor 132 without departing from the present disclosure.

It is recognized that misses counted by a cardinality estimator, such as HyperLogLog, are cold misses because they increase the size of the working set. In contrast, reoccurring misses, including conflict misses, are already in the working set and do not increase the cardinality. Thus, the difference between the total number of misses and the number of cold misses is equal to the sum of all reoccurring misses. For example, if the six addresses 1, 3, 4, 3, 2, 4 are missed, the working set is $\{1, 2, 3, 4\}$ and the cardinality (the number of elements in the set) is four. Thus, 6−4=2 addresses must have been missed more than once and the probability of missing any address is the ratio of the number of reoccurring misses to the total number of misses. i.e., reoccurring miss frequency=2/6=1/3 or 33.3%.

However, this probability cannot be employed directly as a measure of reduction in the size of the working set. In the example above, the working set seen by the cache could be reduced by 1/3 bypassing the addresses 1, 2 and still the miss probability of the remaining addresses 3, 4, 3, 4 would rise to 50%. The cache might have blocks accessed less frequently or dead altogether. If these blocks are available, it would be advantageous to reduce the estimated probability to account for the fact that some blocks could be cached in place of the dead or almost-dead ones—provided the hashing and allocation policy of the cache are effective, or the workload presents reasonable fluctuations.

In one embodiment, a modified version of a streaming technique called the Alon-Matias-Szegedy (AMS) technique is used for estimating the frequency and variance of cache hits. The "reservoir sampling" portion of the technique is modified to drop samples on lookups rather than on hits. This provides a statistical moving window that is consistent with the window employed for misses and enables a comparison of frequencies.

A further aspect of the present disclosure relates to a mechanism for combining the conflict miss frequency (estimated in a HyperLogLog circuit, for example) with the frequency and variance of cache hits (determined using AMS techniques, for example) to provide an estimate of the cache thrashing probability for a cache.

As will be discussed in more detail below, two conceptual steps central to the disclosed combination are provided by "concentration inequalities" and a solution of what is referred to as the "Double Dixie Cup problem." In particular, the solution to the "Double Dixie Cup problem" is inverted to return a function of the number of reoccurring misses, which approximates the average number of occurrences of the same generic conflict miss within a random stream of given length. The probability that a miss can be allocated in the cache in place of a low activity or dead cache block is obtained from concentration inequalities employing the mean and variance for hits. The mean and variance of hits may be obtained by the AMS technique, for example, or online averaging of sample addresses. Example implementations use the Paley-Zygmund and Chebyshev-Cantelli inequalities as estimations.

The inverse Double Dixie Cup solution is useful as long as the number of occurrences of conflict misses is lower than certain thresholds detailed below. Beyond these thresholds, the average number of repeated occurrences just grows linearly because of some "generalized Birthday problem." Namely, the cardinality of the addresses seen by the random stream must be less than the cache or partition capacity, so picking up random addresses has a higher probability of repetition rather than just randomly picking up addresses on an infinite set.

All these operations can be discretized to obtain efficient implementations. In particular, the inverse solution of the Double Dixie Cup problem can be well approximated by very few points (e.g., 3 or 4) of a tabularized piecewise function, implemented by a single multiply-add operation.

Reoccurring-Miss Estimator

Figure 2:
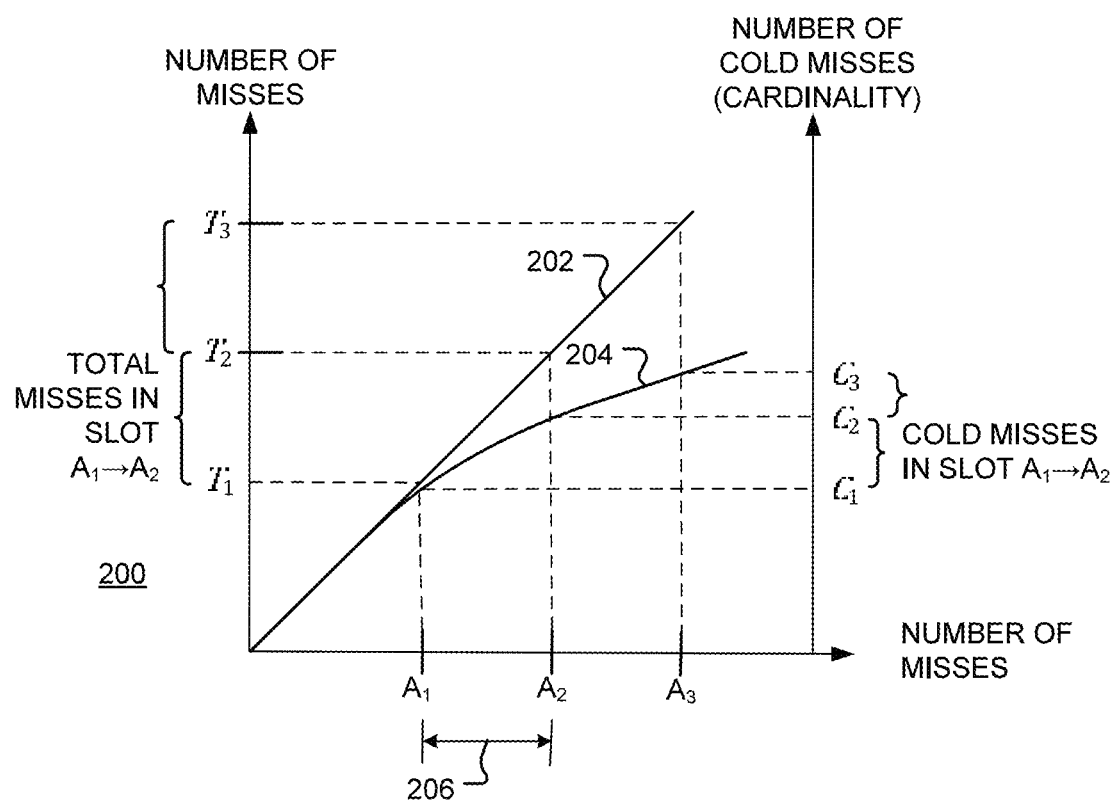
FIG. 2 is a graph showing example cache misses in a data processing system, in accordance with various representative embodiments.

FIG. 2 is a graph 200 showing example cache misses in a data processing system, in accordance with various representative embodiments. Line 202 shows all misses as a function of the number of the number of misses resulting from lookup requests. Line 204 shows the number of cold misses. In this example, distance $A_1$, there has been $T_1$ total misses of which $S_1$ are cold misses. When an address appears for the first time in an address stream it is assumed that it has not yet been allocated in the cache, and so the lookup will result in a miss. When an address appears again in the address stream it is assumed that it has previously been allocated in the cache. Thus, the miss is a reoccurring miss. The number of addresses in the set of unique addresses in the address stream is referred to as the cardinality of the address stream. The number of cold misses is equal to the cardinality of the address stream. The remaining misses are, therefore, reoccurring misses. At distance $A_1$, for example, the number of reoccurring misses is $T_1-S_1$. At distance $A_2$ the number of reoccurring misses is $T_2-S_2$.

An embodiment estimates the size of the working set of a workload being executed by the data processing system and the frequency at which memory blocks are repeatedly missed in a cache and uses this information to detect cache thrashing.

A conflict miss is a miss which would have not occurred in a fully associative infinite capacity cache after the first reference to the missed block. In more operative terms, a conflict miss occurs because all ways of the set for the missed tag are occupied while there are other sets with free cache ways. Thus, conflict misses are a subset of warm misses.

In one embodiment, it is assumed that the size of the working set is estimated independently, and cache lookups are bypassed. In this case, capacity misses are minimized, and the majority of reoccurring misses are conflict misses. Hence, it can be assumed that all reoccurring misses are conflict misses. That is, if a block is being repeatedly missed, it assumed the cause is a conflict miss.

The quantity of conflict misses gives a measure of how much the address hashing function of the cache is not spreading allocations equally over all sets: some sets are oversubscribed while others remain undersubscribed. Different replacement policies can reduce the number of conflict misses in oversubscribed sets down to their theoretical minimum, but cannot remove them so conflict misses must be misses occurring more than once.

Reoccurring Misses

Various embodiments estimate the number of conflict misses by determining a statistical estimate of the number of reoccurring misses in a stream of lookup addresses. In turn, this is done by estimating the cardinality of the missed addresses (the number of addresses seen at least once) and subtracting this from the total number of misses seen.

Figure 3:
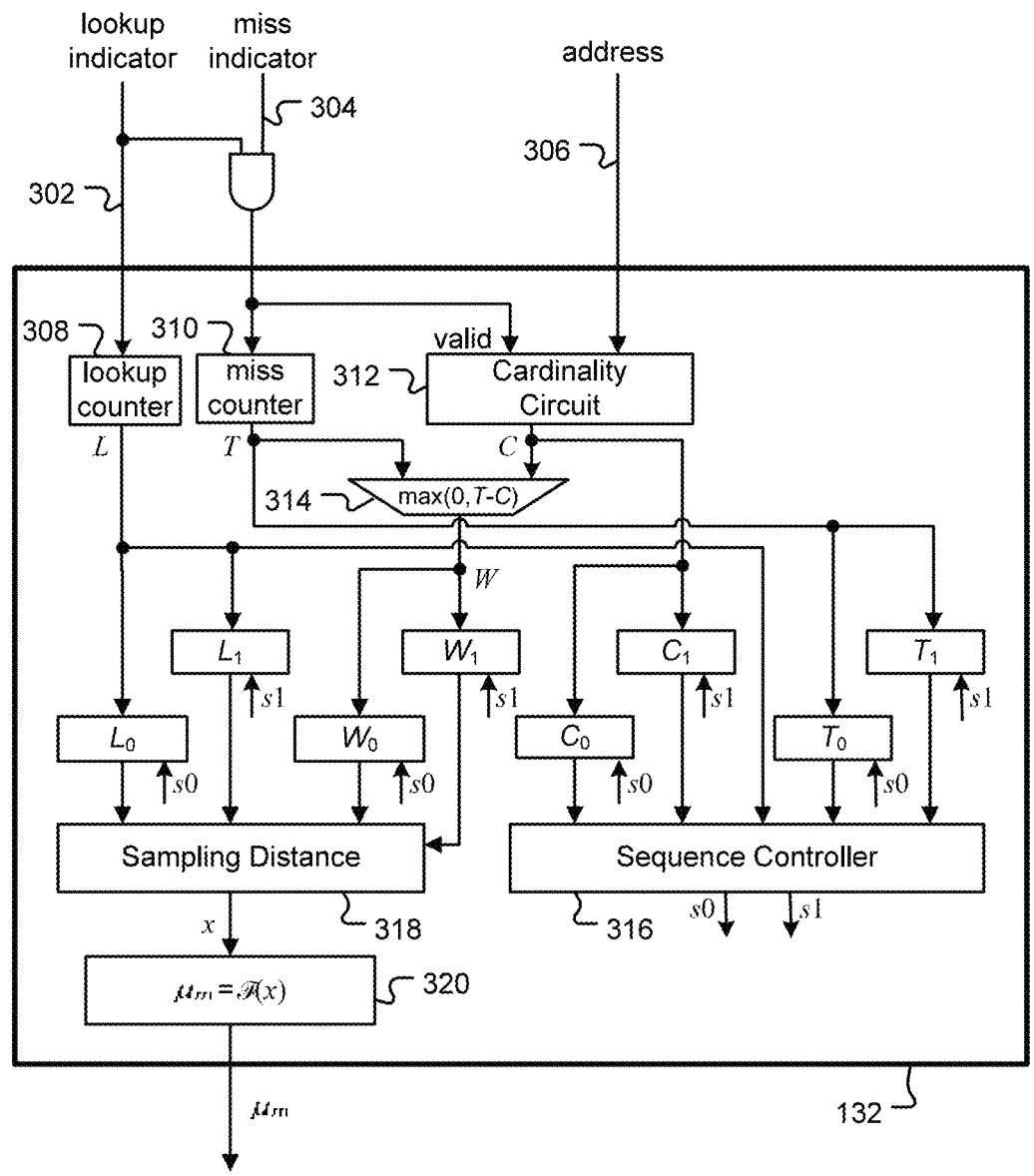
FIG. 3 is a block diagram of a cache miss monitor, in accordance with various representative embodiments.

FIG. 3 is a block diagram of a cache miss monitor 132, in accordance with various representative embodiments. Cache miss monitor 132 is responsive to lookup indicator signal 302, miss indicator 304 and address stream 306. Lookup indicator signal 302 indicates when a new address arrives in address stream 306. Miss indicator 304 indicates if the address lookup resulted in a miss. Cache miss monitor 132 includes lookup counter 308 that keeps a running total of the number L of address lookups in the stream, and miss counter 310 that counts the total number T of misses. Cache miss monitor 132 also includes cardinality circuit 312 that estimates the cardinality of the address stream. As described above, the cardinality is the number C of unique missed addresses and corresponds to the number of cold misses. The number of reoccurring misses is calculated at 314 as W=max (0, T−C), where "max" denotes the maximum value. (It is noted that C is a statistical estimate and, although unlikely, may be larger than T in a measurement period.)

The counts L, W, C and T are saved in registers at the end of each measurement period. The counts may be saved in two-element delay lines or in ping-pong buffers, for example. The latter is shown in FIG. 3. Selection of which buffer to use is controlled by sequence controller 316 that provides selection signals s0 and s1. For example, when s0 is asserted, counts L, W, C and T are saved in registers $L_0$, $W_0$, $C_0$ and $T_0$, respectively. When s1 is asserted, counts L, W, C and T are saved in registers $L_1$, $W_1$, $C_1$ and $T_1$, respectively.

The value $W_1-W_0$ represents the number of reoccurring misses occurring in the measurement period while the distance $L_1-L_0$ represents the number of lookups in that measurement period. Circuit 318 is configured to determine a sampling distance x defined as $x=W_1-W_0/L_1-L_0$, which indicates the ratio of the number of reoccurring misses to measurement distance.

The goal is to calculate the mean temperature $\mu_m$ of a reoccurring miss and compare it against the mean temperature $\mu_h$ of a hit. If $\mu_m \leq \mu_h$ has a high probability, reoccurring misses should be bypassed with high probability because they might allocate onto a block which has higher probability of being hit. If $\mu_m > \mu_h$ has a high probability, reoccurring misses should be allocated because the occupancy in the cache has lower probability of being hit.

The temperature $\mu_m$ may be estimated as the ratio T/C, of the total number T of misses divided by the number C of cold misses (the number of unique addresses). However, this estimation does not follow the workload. For this reason, the change in the number of reoccurring misses, $W_1-W_0$, is converted into the size of a working set which random references would visit and this size is divided by the number of visits to estimate $\mu_m$. For comparing $\mu_m$ with $\mu_h$, which is obtained on a statistical window of SAMPLING_DISTANCE distance, $W_1-W_0$ is scaled to what would be seen on SAMPLING_DISTANCE. Thus, the working set is determined as $(W_1-W_0)/(L_1-L_0)$. SAMPLING_DISTANCE.

Finally, circuit 320 maps the sampling distance x to an estimate $\mu_m$ of the average number of occurrences of the same generic conflict miss within a random address stream of given length. The mapping may be implemented as a lookup table with or without interpolation, for example.

In one embodiment, each estimation of the number of cold misses is performed over a time slot or window that includes a specified number of address look-ups. At the end of each window, the number of reoccurring misses is estimated by subtracting the number of cold misses from the total number of misses in the window.

When carrying out an estimation, a minimum measurement distance is required to obtain a reliable estimation. Several statistical tests exist for this, but a simple criterion is that there should be enough visits such all the elements of set whose size is being estimated are randomly visited at least once.

There are two different settings for this problem. In the first setting, when a set size is estimated, it can be determined if enough distance has been covered in terms of observed references for that estimation. The average distance for this case may be obtained as a solution of a "Birthday Problem." The solution states that when, for m times, one out of n items, is selected, the mean number of items chosen at least once is:

$$n(1-(1-1/n)^m).$$

In the second setting, when a mean number of references has been estimated, it can be determined what distance is sufficient to estimate this mean value. The average distance for this case may be obtained as a solution of a Dixie Cup Problem. The solution (shown in FIG. 4) provides the mean number of times the same item is selected when, for m times, one item is randomly selected out of n items. That is, the solution provides the mean number of times the same address is missed in a stream of m misses when the working set size is n.

Figure 4:
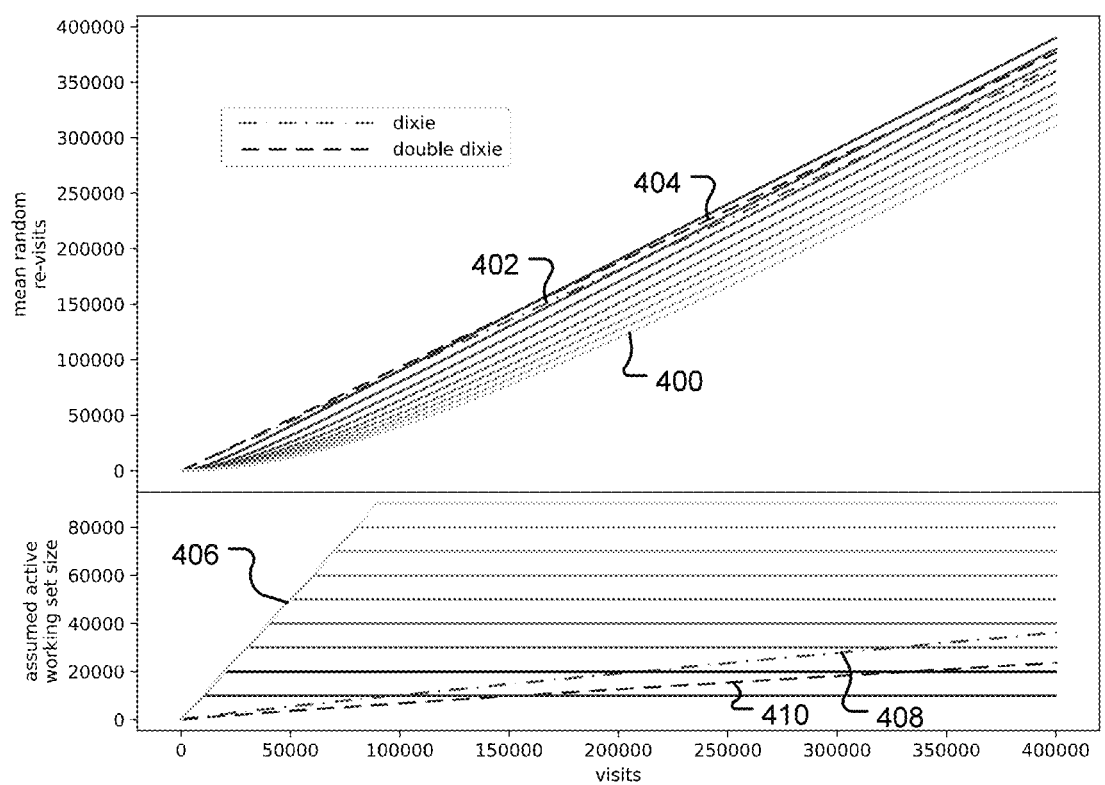
FIG. 4 shows example solutions to the Dixie and Double-Dixie cup problems.

FIG. 4 shows example solutions to the Dixie and Double-Dixie cup problems. The upper diagram shows the mean number of random re-visits as a function of the total number of visits. The solid lines 400 correspond to the mean number of references obtained per estimated active working set size. The Dixie cup solution is shown as the broken line 402 with dots and dashes. The Double-Dixie cup solution is shown as the broken line 404 with dashes only. The solution for the mean number of references is obtained as maximum of the Double-Dixie solution line 404 and the solid lines 400. For small distances, line 404 dominates the estimation because the size of the active working set can be considered arbitrarily large. When the number of visits increases, the limited size for the active working set, given by lines 400, becomes increasingly significant. Given a mean amount of choices of the same item, the plot in FIG. 4 shows what distance should have been covered by random visits to achieve this mean amount.

In the lower diagram in FIG. 4, the solid lines 406 are working set sizes of misses, while line 408 and 410 are the working set sizes implied by the solution of the Dixie and Double-Dixie cup problems, respectively.

The upper diagram shows the estimations per number of conflict misses. Depending on the working set size, these estimations are surpassed by the solid lines 400 computed as inverse solution of the so-called "generalized birthday problem." The function F(x), implemented as 320 in FIG. 3, is the maximum of both functions. Depending on the working set size, the linear function overtakes the other at larger number of accesses.

In the cache monitor, measurements are started after the data processing system begins execution of a workload and may be restarted after some longer time, when the working set is assumed to have aged enough that repeated misses can be considered obsolete. After reset and initialization of logic and memory in cardinality estimator, sequence controller 316 waits until a warmup phase has been concluded since, when starting a measurement, all misses are regarded as cold because they had not been seen earlier. This would make the probability of a conflict miss drop to zero soon after measurements are restarted. When measurements are restarted, the warm-up distance ensures a low probability of conflict misses is not reported during this initial phase. The warm-up distance enables the working set size to reach a stable level. This stabilization is achieved when the growth rate of the working set size falls below a low rate. The growth rate is computed as the ratio $(C_1-C_0)/(T_1-T_0)$, where $C_1$ and $C_0$ are two working set sizes determined at distances $T_1$ and $T_0$.

Cardinality Circuit

Figure 5:
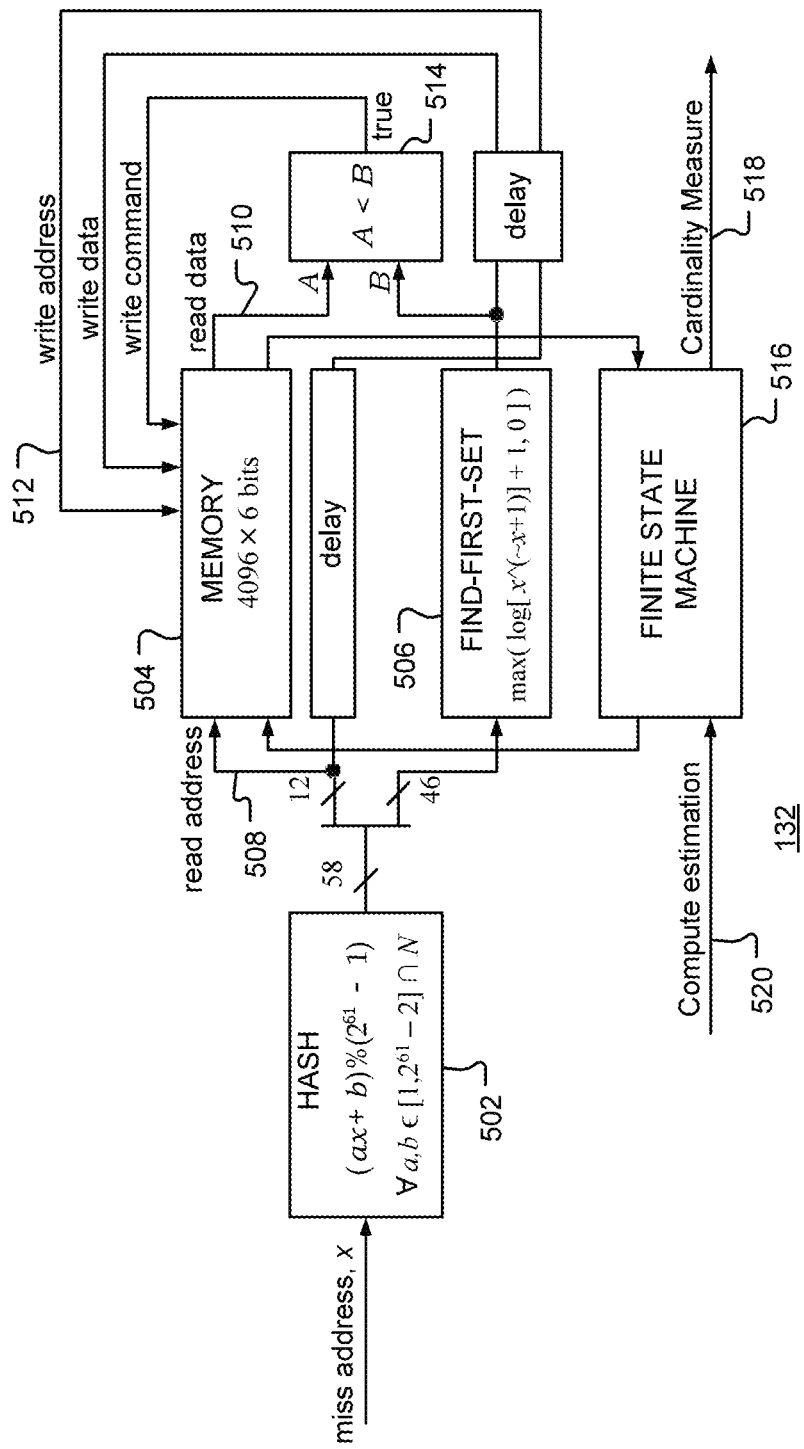
FIG. 5 is a block diagram of an example implementation of a cardinality circuit, in accordance with various representative embodiments.

FIG. 5 is a block diagram of an example implementation of a cardinality circuit 312, in accordance with various representative embodiments. The cardinality circuit implements a HyperLogLog statistical estimator. A direct measurement of the cardinality is impractical in many applications since it requires a list of addresses to maintained against which new lookup addresses be compared. In general, this requires too much storage. In the example shown in FIG. 5, hash circuit 502 generates a hash value output with 58 bits. Twelve of the bits are used as an index to memory 504 and the remaining 46 bits provide a bit vector. Other hash functions may be used. In addition, separate hash functions could be used for the index and the bit vector. Circuit 506 may determine length of match between the bit vector and a pattern. In the embodiment shown, the pattern match length is given by the position of the first set bit in the bit vector (starting from the least significant bit). Other match patterns may be used without departing from the present disclosure. The index is used first as a read address 508 to read a previous maximum pattern match length 510 from memory 504 and then as a write address 512 if the maximum length is to be updated, as indicated by the output from comparator 514. Finite state machine 516 performs reciprocation and de-biasing operations at the end of an interval to produce estimated cardinality 518. An interval may be a designated number of message values received, for example, and the end of an interval is indicated by signal 520. Circuit 516 may perform an iterative computation using fixed-point arithmetic for a designated precision p and data width w. In one embodiment, circuit 516 performs a fixed-point Newton-Raphson iteration.

Figure 6:
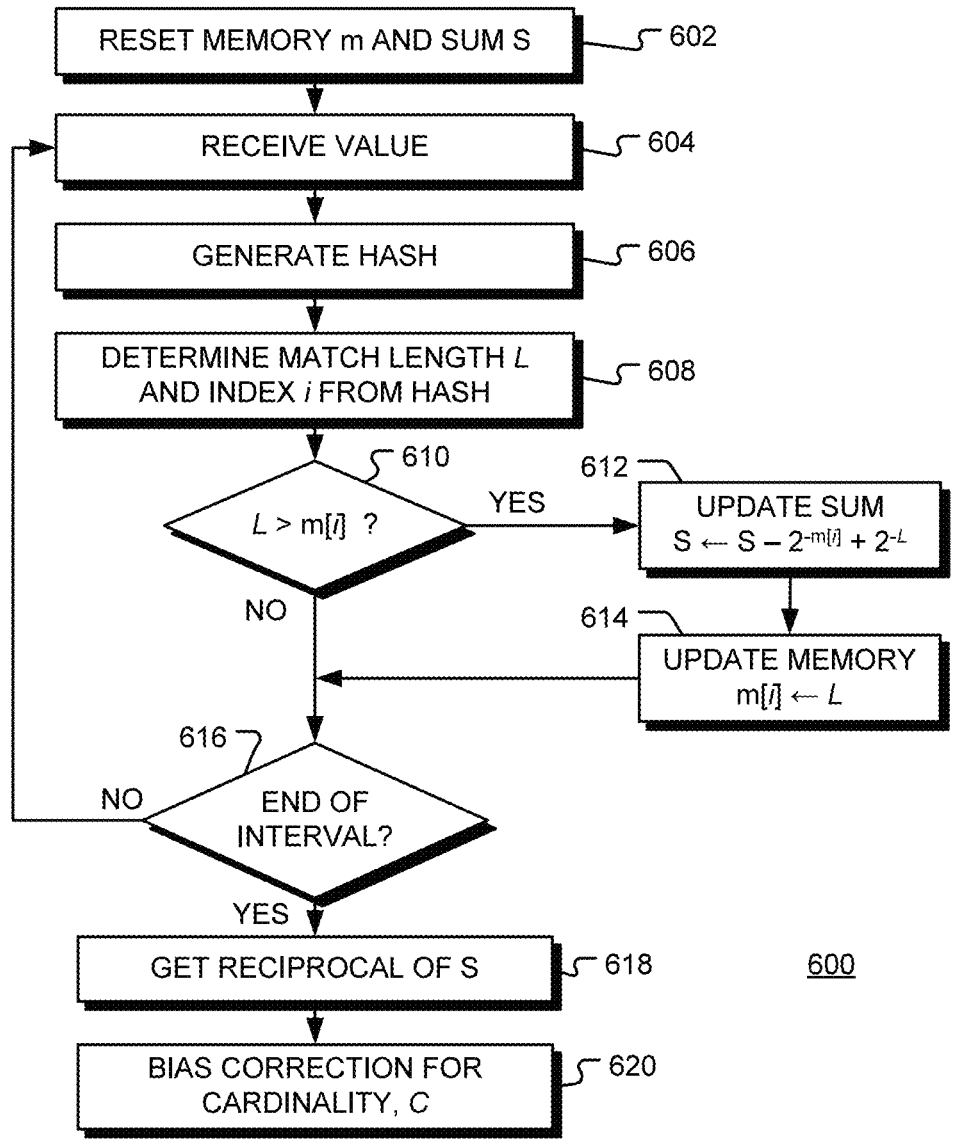
FIG. 6 is a flow chart of a method of determining a statistical cardinality, in accordance with various embodiments.

FIG. 6 is a flow chart of a method 600 of determining a statistical cardinality, in accordance with various embodiments. The method uses a modified HyperLogLog technique to estimate the cardinality of message values received in an interval. The interval may be a period of time or a specified number of message values, for example. A memory array, allocated to the cardinality estimator, is reset at block 602. This may be done by setting memory values to zero or by clearing validity bits for each memory location. A stored sum value is also reset to zero. The memory may be reset at the start of each interval. At block 604 a message value is received. A message value may be a memory address associated with a request by a cache client to access data associated with the memory address. A hash of the message value is generated at block 606. The hash may be generated by a circuit designed to randomize the message values. For example, the hash of a message value v may be calculated as $h(v)=(av+b) \% (26^1-1)$, for some integer values a and b. A cryptographic hash function may be used. Any suitable uniform hash may be used. There is an advantage in selecting a hash function at random (universal hashing) when starting the measurement, because this prevents that random pathological or malicious workload realizations cause static measurement errors due to a high amount of hash collisions. Optionally, when message values are uniformly distributed across a range of values, or approximately so, the hash operation may be omitted. At block 608, a pattern match length L and index i are determined from the hash value.

In one embodiment, a 58-bit hash value is used. Bits 46-57 of the hash value, denoted as h(57:46), are used to indicate an index $i_1$ and h(45:0) is used to give a bit vector $x_1$. The number of bits in $x_1$ that match a pattern, referred to as the pattern match length L, is then found. For example, the pattern may be all zeros, with the pattern match length given by the number of tailing zeros plus one (since the first bit adjacent the trailing zeros must be set, i.e., match "one"). Mathematically, this is given by:

$$L(x)=\max[\log_2(x\&(\neg x+1)+1,0],$$

where $\neg x$ denotes the bit-wise complement of x. The hash value may be apportioned in different ways. In one embodiment, for example, the trailing bits are used as the index so that $x_1$=h[57:48] and $x_2$=h[57:46].

The HyperLogLog method uses the maximum match length for each of N indices and determines a statistical cardinality count C as:

$$C=\alpha(N)S^{-1},$$

where $\alpha(N)$ is a scale factor, dependent upon N, and S is the summation value:

$$S=\Sigma_{n=0}^{N-1}2^{-m[n]}.$$

and the value m[n] is the maximum pattern match length for index n. The scale factor $\alpha(N)$ is a multiplicative constant that includes bias correction. This has a static value for all estimations of cardinalities above certain low threshold and may be read from a table. The value $2^{-L}$ denotes the probability of L−1 consecutive bits matching the chosen pattern and the next bit not matching the chosen pattern when the hash values are uniformly distributed.

Referring again to FIG. 6, the pattern match length L is compared with a previous maximum value m[i] stored at index i in the memory at decision block 610. When the pattern match length L is greater than the previous maximum value m[i], as indicated by the positive branch from decision block 610, a summation value is updated at block 612 by subtracting the $2^{-m[i]}$ and adding the new value $2^{-L}$. The memory at index i is updated with the new maximum at block 614. When the pattern match length L is not greater than the previous maximum value m[i] as indicated by the negative branch from decision block 610, flow continues to decision block 616. If the interval has not ended, as depicted by the negative branch from decision block 616, flow returns to block 604 to receive the next value. If the interval has ended, e.g., a designated time has passed or a designated number of message values have been processed, as depicted by the positive branch from decision block 616, the reciprocal $S^{-1}$ of the summation S is determined at block 618 and scaled by $\alpha(N)$ at block 620 to provide the statistical cardinality count C. In one embodiment, reciprocation is performed by a hardware implementation of "Newton-Raphson Reciprocation," as discussed below.

Accuracy of statistical cardinality depends on the number N of memory locations, m[i], and the length of time over which the cardinality is measured.

Hit Monitor

The number of occurrences of address a in a block of addresses of an address stream is denoted as frequency $f_a$. A first accumulator value $F_1$ is defined as:

$$F_1 \triangleq \Sigma_{a \in A} f_a$$

where A is sample set of currently and previously tracked address. Each time an address b in the sample set of currently tracked address occurs in the stream, the corresponding frequency is updated as:

$$f_b' \leftarrow f_b+1.$$

and the first accumulator value is updated as:

$$F_1' \leftarrow F_1+1.$$

When a total of $N_{samp}$ addresses have been tracked, the first frequency moment or average frequency of occurrence can be obtained from the first accumulated value as:

$$\mu = F_1/N_{samp}.$$

A second accumulator value is defined as:

$$F_2 \triangleq \Sigma_{a \in A} f_a^2.$$

Each time an address b in the sample set of tracked address occurs in the stream, the second accumulator value and frequency counter are updated as:

$$F_2' \leftarrow F_2 - f_b^2 + (f_b+1)_2 = F_2 + 2f_b + 1, f_b' \leftarrow f_b + 1.$$

Equivalently, they may be updated as:

$$f_b' \leftarrow f_b+1, F_2' \leftarrow F_2 + 2f_b' - 1.$$

When a total of $N_{samp}$ addresses have been tracked, the second moment of frequency or average squared frequency can be obtained from the second accumulated value as:

$$M^{(2)} = F_2/N_{samp}.$$

An embodiment of the hit monitor includes two concurrent processes acting on a content addressable memory (CAM). A CAM can be regarded as a full associative cache, where values are looked up by address. Processes are provided for removal and allocation of CAM entries. The first and second frequency moments may be estimated via the AMS algorithm, which is based on the principle of reservoir sampling. This principle states that the evaluation of statistics on a large data set can be estimated from a representative small reservoir of samples randomly drawn from that data set. The size of the reservoir is denoted as "COUNTERS." For every entry one address hit is allocated in the cache and the number of times this address is hit is counted. The difficulty lies in the fact that the addresses (samples) arrive one after the other over an undefined number of steps.

In one embodiment, samples in the reservoir are retained for an average number of lookups, denoted as "SAMPLING_DISTANCE." Sample addresses are dropped with a probability of COUNTERS/SAMPLING_DISTANCE, so every item will stay in the reservoir on average for SAMPLING_DISTANCE lookups. The number of hits per address is counted. Each address lives in the reservoir on average SAMPLING_DISTANCE lookups, so all the hits counted are hits over on average SAMPLING_DISTANCE lookups. The number of addresses seen in the reservoir are counted as $N_{samp}$. The number of CAM hits $F_1$ is counted in a first accumulator while a second accumulator counts $F_2$, which is a recursive count of the square of number of CAM hits. The use of a statistical sliding window enables a lot of addresses from the cache to be sampled, since old addresses are removed and replaced by new ones.

Figure 7:
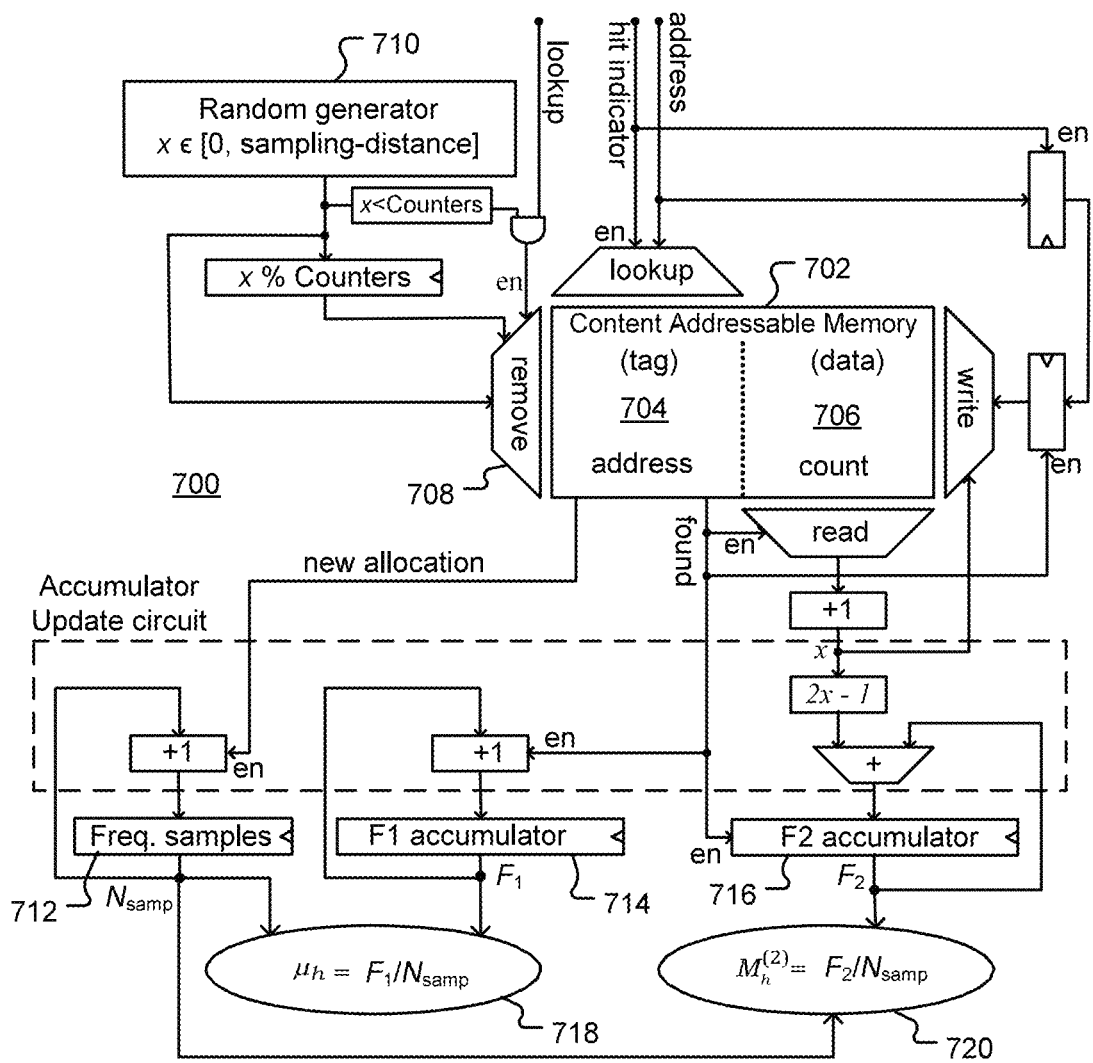
FIG. 7 is a block diagram of a cache hit monitor, in accordance with various representative embodiments.

FIG. 7 is a block diagram 700 of a cache hit monitor 130, in accordance with various representative embodiments. Cache hit monitor 130 is configured to determine the first and second accumulated values discussed above for addresses that hit in the cache. Cache hit monitor 130 includes a content-addressed memory (CAM) 702. The CAM can be regarded as a small fully associative cache that stores randomly selected addresses a(i) of hits in tag region 704 together with corresponding counts c(i) in data region 706. Counts, which correspond to frequencies of occurrence, are updated when a hit address is visited. Removal port 708 randomly selects an entry and removes it. The random removal is carried out only if a random integer between 0 and SAMPLING_DISTANCE is lower than COUNTERS, where SAMPLING_DISTANCE is the distance (number of addresses) of a statistical sliding window and COUNTERS is the number of entries in CAM 702. The random integer is generated by pseudo-random number generator 710. In one embodiment, pseudo-random number generator 710 is a Park-Miller-Carta Pseudo-Random Generator, which has a simple implementation.

The pseudo-random number generator produces a number within the range [0, SAMPLING_DISTANCE]. If this number is lower than the configured number of counters in hardware, then one random counter is deallocated. On a miss in the CAM, the lookup logic tries to find the address in one entry, on failing that it tries to allocate one address in one free entry. If no free entry can be found the operation is aborted. Unlike a conventional cache, no eviction is carried out to make space for a new allocation.

Whenever a new reference is allocated in CAM 702, the value $N_{samp}$ of accumulator 712 is incremented. The value $N_{samp}$ indicates the total number of address samples that have been tracked.

Whenever a stream address of a hit matches a current address in the CAM, the value $F_1$ of accumulator 714 is incremented and the corresponding count in the CAM is updated.

Whenever a stream address of a hit matches a current address a(i) in the CAM, the value $F_2$ of accumulator 716 is incremented by an amount $2 \times c(i) - 1$, where c(I) is the count associated with a(i).

Calculations of $\mu_h = F_1/N_{samp}$ and $M_h^{(2)} = F_2/N_{samp}$ are represented in ellipses 718 and 720, respectively. These calculations are optional in some implementations because subsequent computations consuming these results can use the nominators and/or denominators of the ratios separately, avoiding the need to carry out a division operation.

In one embodiment, the number of conflict misses, determined as the total misses minus the cold misses (estimated by the cardinality circuit). The average occurrence of repeated misses is compared with the average occurrence of repeated hits to limit the growth of the estimated probability of conflict miss. This limit allows blocks to be allocated in the cache to replace blocks presumed dead or almost-dead.

A variance $\sigma_h^2$ is defined as:

$$\sigma_h^2 = M_h^{(2)} - \mu_h^2.$$

Figure 8:
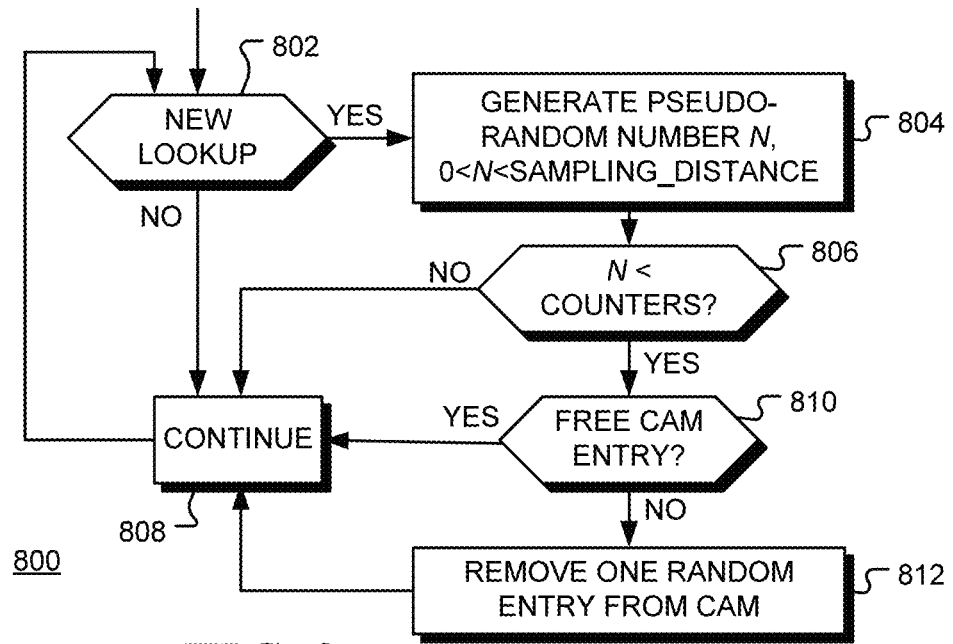
FIG. 8 is a flow chart of a method of deallocating entries in a content addressable memory (CAM), in accordance with various representative embodiments.

FIG. 8 is a flow chart of a method 800 of deallocating entries in a CAM, in accordance with various representative embodiments. In this example, a statistical sliding window of average length SAMPLING_DISTANCE is used. This length is measured as cache lookups. The CAM stores addresses and has size COUNTERS. When a new cache lookup occurs, as depicted by the positive branch from decision block 802, a pseudo-random number N is generated at block 804. The number N is an integer between 0 and SAMPLING_DISTANCE, where SAMPLING_DISTANCE is the distance (number of addresses) of a statistical sliding window. If the N is not less than COUNTERS (the number of entries in the CAM), as depicted by the negative branch from decision block 806, flow returns to block 802 via block 808. If the N is less than COUNTERS, as depicted by the positive branch from decision block 806, flow continues to decision block 810. If there is already a free entry in the CAM, as depicted by the positive branch from decision block 810, flow returns to block 802 via block 808. Otherwise, as depicted by the negative branch from decision block 810, one entry in CAM is selected at random (e.g., entry N) and removed from the CAM at block 812. If there are free places in the reservoir, the reservoir must be filled before items can be dropped to achieve an average retention time equal for every item.

In this manner, the expected number of lookups for which an entry remains in the CAM is given by SAMPLING_DISTANCE.

Figure 9:
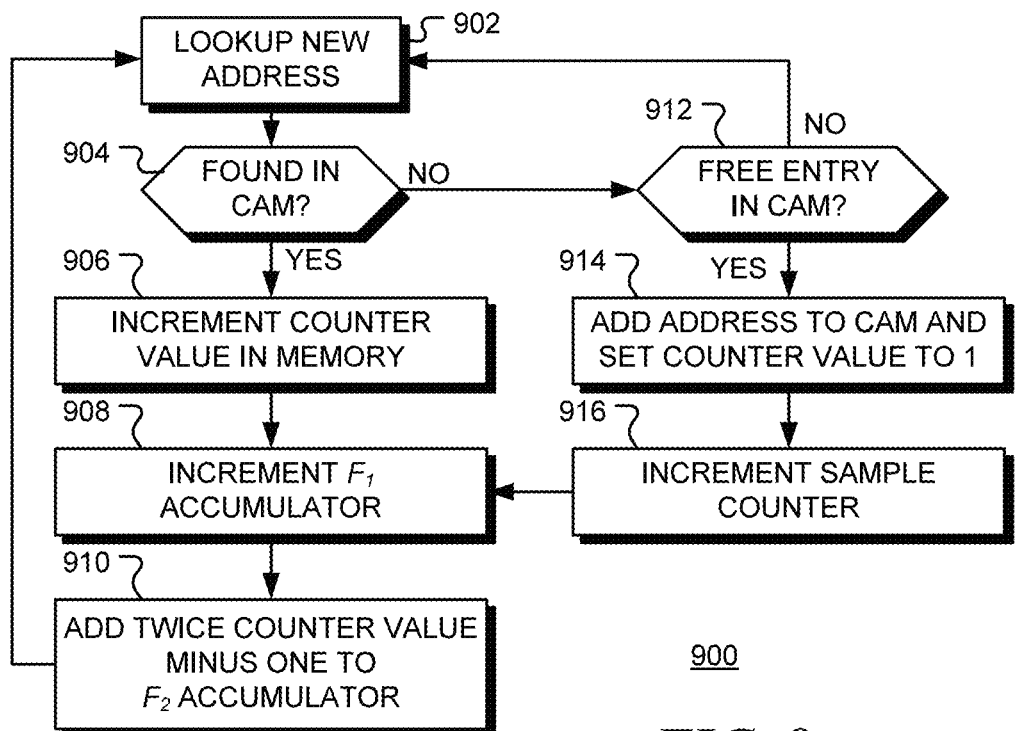
FIG. 9 is a flow chart of a method of allocating entries in a CAM and updating accumulated values in a hit monitor, in accordance with various representative embodiments.

FIG. 9 is a flow chart of a method 900 of allocating entries in a CAM and updating accumulated values in a hit monitor, in accordance with various representative embodiments. A new address is looked-up in the CAM at block 902. At decision block 904, it is determined if the address is found (a hit) in the CAM or not (a miss). On a hit in the CAM, depicted by the positive branch from decision block 904, a counter value corresponding to the address is incremented at block 906. At block 908, a first accumulator, $F_1$, is incremented. At bock 910, twice the counter value minus one is added to a second accumulator, $F_2$. In an alternative embodiment, twice the counter value plus one is added to a second accumulator, $F_2$, before the first accumulator, $F_1$, is incremented. On a miss in the CAM, as depicted by the negative branch from decision block 904, flow continues to decision block 912 to determine if a new allocation can be made. If there is no free entry in the CAM, as depicted by the negative branch from decision block 912, this sample is dropped, and flow returns to block 902. If there is a free entry in the CAM, as depicted by the positive branch from decision block 912, the address is added to the CAM for tracking at block 914 and the corresponding counter value is set to one. At block 916 the $N_{samp}$ counter is incremented. This counter counts the number of allocations to the CAM and is used for normalization. Flow then continues to block 908 and 910 where the accumulators are updated.

FIG. 10 is a listing of a program of computer instructions for updating CAM elements in a hit monitor, in accordance with various representative embodiments. The instructions use the Python programming language. In the listing, the symbol "→" is used to denote continuation to the next line. Components of data structure self include:
- self.F1_counters: this component stores current counter values for each sample address, self.F1_accumulator: this component stores the $F_1$ accumulator value, self.F2_accumulator: this component stores the $F_1$ accumulator value, and self.frequency_samples: this component stores the number of address samples, $N_{samp}$.

The program of computer instructions has been used to simulate operation of a CAM update process. However, embodiments of the disclosure may be implemented wholly or partially in dedicated electronic circuits.

Figure 11:
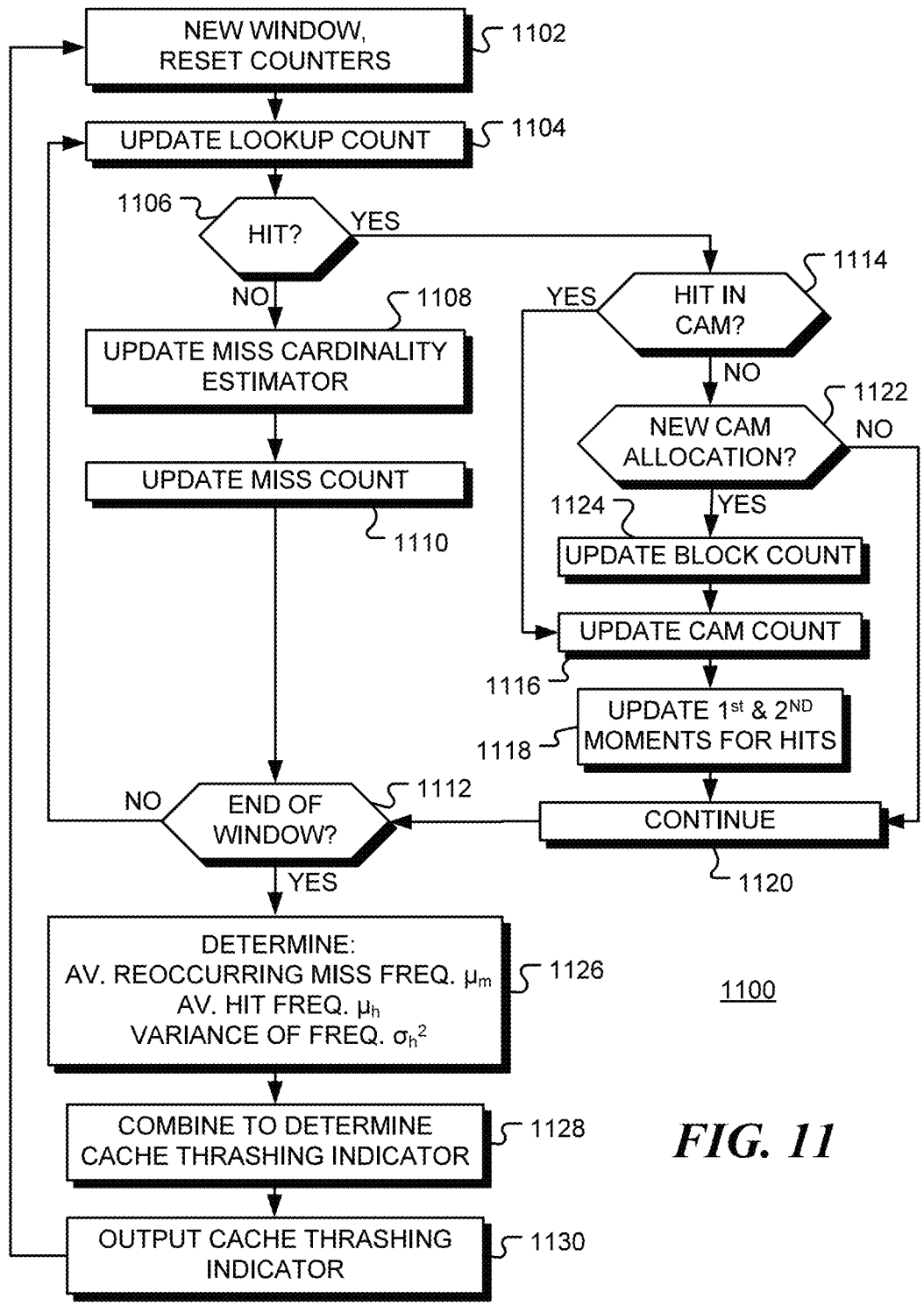
FIG. 11 is a flow chart of a method of monitoring a cache, in accordance with various representative embodiments.

FIG. 11 is a flow chart of a method 1100 of monitoring a cache, in accordance with various representative embodiments. A new window on a stream of cache lookups is started at block 1102 and lookup and miss counters are reset to zero. When a new lookup is indicated at the cache monitor, the lookup counter is incremented at block 1104. When the lookup is associated with a miss in the cache, as depicted by the negative branch from decision block 1106, a miss cardinality estimator is updated at block 1108. As described above, the miss cardinality estimator may be implemented as a HyperLogLog circuit. The miss counter is incremented at block 1110. If, as indicated by the lookup counter, the window has not ended, flow returns to block 1104, as depicted by the negative branch from decision block 1112. When the lookup is associated with a hit in the cache, as depicted by the positive branch from decision block 1106, flow continues to decision block 1114. When the looked-up address is being tracked by the hit monitor, the address results in a hit when looked-up in the CAM, and, as depicted by the positive branch from decision block 1114, flow continues to block 1116 where the counter associated with the address in incremented in the cache. The first and second moments are then updated at block 1118 and flow continues, via continuation block 1120, to decision block 1112.

When the lookup is associated with a hit in the cache, but the looked-up address is not being tracked by the hit monitor, the address results in a miss when looked-up in the CAM, and, as depicted by the negative branch from decision block 1114, flow continues to decision block 1122. When there is a new allocation made in the CAM, as depicted by the positive branch from decision block 1122, the block counter is incremented at block 1124 to indicate an increase in the number of frequency samples and flow continues to block 1116.

When the lookup counter indicates an end to a window on the address stream, as depicted by the positive branch from decision block 1112, the average frequency of reoccurring misses $\mu_m$, the average hit frequency of hits $\mu_h$ and the variance of hit frequencies on are determined at block 1126. These quantities are combined at block 1128 to determine a cache-thrashing indicator. The cache-thrashing indicator is output at block 1130 to enable control of the data processing system (by adjusting the cache bypass, allocation of the workload, or partitioning in the cache, for example). Determination of the cache thrashing indicator is described below.

Cache Thrashing Indicator/Bypass Factor

The "bypass factor" b steers the bypassing of cache misses. When a cache miss occurs, the missed data is allocated in the cache with random probability 1−b so misses are converted with probability b in bypasses.

The concept behind this estimator is that b is pulled by two opposing forces in a "tug-of-war" scheme. A higher average frequency of misses $\mu_m$ drives b high until no further misses occur because they are replaced by bypasses, while the probability that capacity is available in the cache, estimated from $\mu_h$ and $\sigma_h$, drives b low because misses can in principle be allocated.

This concept intentionally exerts a global control on the cache, so if a single set is thrashed by oversubscription but the cache has available capacity, the thrashing misses have a low probability of being bypassed. However, if the thrashing occurs on a larger scale, then the pull to drive b higher is higher and misses are bypassed. If the cache faces thrashing on individual sets but not on a larger scale, then other techniques like a different hashing algorithm can be applied. In this case this estimator could deliver an alert to start a monitor of heavy hitters, like Misra-Gries counting, for identifying the oversubscribed set.

As described above, the estimator operates on a warm cache. Controller 316 in FIG. 3 activates an initialization step on startup to measure the growing working set. On detecting that a warm-up has occurred, the controller activates an evaluation step in which the control lines s0 and s1 enable the $L_0$, $L_1$, $W_0$, $W_1$, $C_0$, $C_1$, $T_0$ and $T_1$ registers to sample their inputs when valid and deliver estimations.

Replacement of Near-Dead Cache Occupancy

Blocks allocated in the cache might become dead (not referenced anymore in the future) or near-dead (rarely referenced in the future) over time. It is desirable that misses are not bypassed when there is sufficient capacity to allocate them in the cache by replacing current occupancy that is dead or near dead. In order to determine whether it is convenient to evict occupancy in the cache and allocate new blocks, the probability that a new block will have a higher temperature than a block in the cache is estimated based on the mean temperature of a miss $\mu_m$, the mean temperature of a hit $\mu_h$, and the standard deviation on of a hit.

The probability that the mean hit rate of a block is higher than the mean reoccurring miss rate of a block must be higher than the bound may be determined based on the Paley-Zygmund inequality. The Paley-Zygmund inequality provides a lower bound to the probability that a positive random variable z is greater than a fixed value a, namely:

$$P(z>a) \geq (E(z)-a)^2/E(z^2)$$

This bound is effective for $a<<E(z)$, because it is a measure of the concentration of the distribution, derived through the Cauchy-Schwarz inequality. If $a>E(z)$, then $E(z^2) \geq E(z|z>a)/\sqrt{P(z>a)}$ must be large and the distribution cannot be concentrated.

The probability that the mean hit rate of a block is lower than the mean reoccurring miss rate of a block is lower than the bound given by the Chebyshev-Cantelli inequality. The Chebyshev-Cantelli inequality provides an upper bound to the probability that a random variable z is larger than a positive fix value a. The value $\sigma^2(z)=E(z^2)-E(z)^2$ is the variance of z, the Chebyshev-Cantelli inequality is commonly given for a constant c as $$P(z \geq E(z)+c) \leq \sigma^2(z)/\sigma^2(z)+c^2$$

Setting $c=a-E(z)$ gives $$P(z \geq a) \leq \sigma^2(z)/\sigma^2(z)+(a-E(z))^2$$

for $a>E(z)$.

These probability bounds may be combined to determine a cache-thrashing indicator that, in turn, may be used as a bypass factor. When the mean hit rate of a block is higher than the mean reoccurring miss rate of a block, misses are bypassed with the probability $(W_1-W_0)/(T_1-T_0)$ that they are reoccurring or at a higher probability, indicated by the Paley-Zygmund inequality, to protect hot content in the cache from being evicted by colder content allocated by misses.

When the mean hit rate of a block is lower than the mean reoccurring miss rate of a block, then misses are bypassed with the probability $(W_1-W_0)/(T_1-T_0)$ that they are reoccurring or at a lower probability, indicated Chebyshev-Cantelli inequality, to let hot content outside the cache be allocated by misses in place of colder content in the cache.

Thus, in an embodiment, a cache-thrashing indicator or bypass factor b is determined as:

$$b = \begin{cases} \min\left(1 - \dfrac{(\mu_h - \mu_m)^2}{M_h^{(2)}}, \dfrac{W}{T}\right), & \text{when } \mu_h \geq \mu_m \\ \max\left(1 - \dfrac{\sigma_h^2}{\sigma_h^2 + (\mu_m - \mu_h)^2} \cdot \dfrac{W}{T}\right), & \text{when } \mu_m > \mu_h \end{cases}$$

This cache-thrashing indicator is based on the number of reoccurring misses $\mu_m$, the first frequency moment $\mu_h$ and the second frequency moment $M_h^{(2)}$. The indicator is also based on the ratio W/T, where $T=T_1-T_0$ is the number of addresses in the stream of addresses for which a corresponding lookup request resulted in a miss in the cache and $W=W_1-W_0$ is the number of reoccurring misses in the address stream.

In an embodiment, the variance $\sigma_h^2$ of hit frequencies is set as a parameter. The value of the variance parameter $\sigma_h^2$ may be selected by a user, for example. The second moment can then be determined from the parameter and the measured first moment as:

$$M_h^{(2)} = \sigma_h^2 + \mu_h^2,$$

rather than being measured directly as described above. The variance $\sigma_h^2$ is referred as the second central moment. The values $\{\mu_h, M_h^{(2)}\}$ and the values $\{\mu_h, \sigma_h^2\}$ provide equivalent information. Hence, references to a second moment may refer to the "raw" second moment $M_h^{(2)}$ or the second central moment $\sigma_h^2$.

Figure 12:
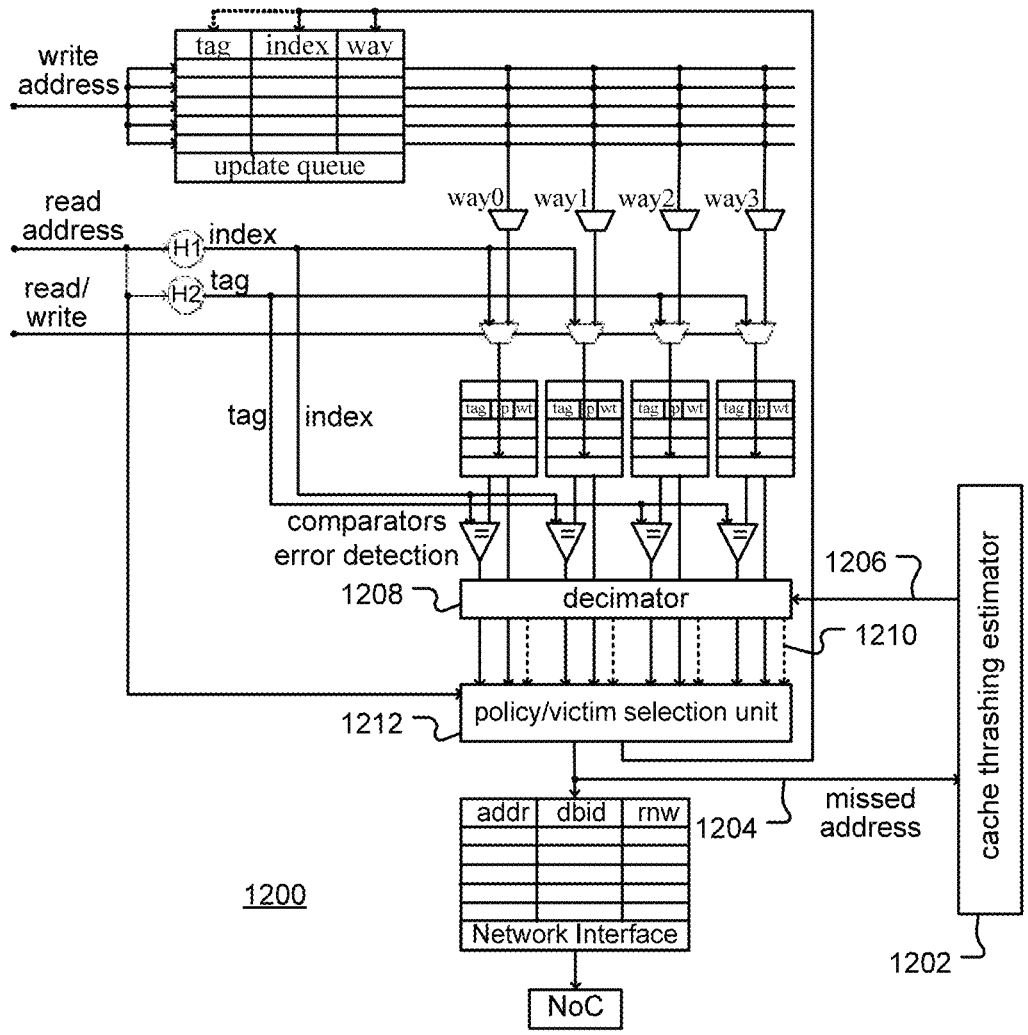
FIG. 12 shows an example cache with controlled bypass of misses, in accordance with various representative embodiments.

FIG. 12 shows an example cache with controlled bypass of misses, in accordance with various representative embodiments. Cache thrashing estimator 1202 receives stream 1204 of missed address and determined bypass factor 1206 therefrom. As described above, cache thrashing estimator 1202 may receive a stream of lookup addresses in addition to a hit/miss indicator signal. Decimator 1208 bypasses a portion of the missed addresses rather than allocating them in the cache. In one embodiment, bypassing consists of drawing an x-bits random number and then bypassing if the drawn number falls below $b2^x$, with b being the bypass factor 1206. Signals 1210 from decimator 1208 indicate to policy/victim selection unit 1212 when a miss is to be bypassed. Other bypass arrangements may be used without departing from the present disclosure.

In a verification test, use of the cache monitor to control a cache bypass resulted in a decrease of the requested downstream bandwidth of 1−0.3721/0.278=0.3384.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or," as used herein, is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

As used herein, the term "configured to," when applied to an element, means that the element may be designed or constructed to perform a designated function, or that is has the required structure to enable it to be reconfigured or adapted to perform that function.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Dedicated or reconfigurable hardware components used to implement the disclosed mechanisms may be described, for example, by instructions of a hardware description language (HDL), such as VHDL, Verilog or RTL (Register Transfer Language), or by a netlist of components and connectivity. The instructions may be at a functional level or a logical level or a combination thereof. The instructions or netlist may be input to an automated design or fabrication process (sometimes referred to as high-level synthesis) that interprets the instructions and creates digital hardware that implements the described functionality or logic.

The HDL instructions or the netlist may be stored on non-transitory computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define an HDL representation of the one or more logic circuits embodying the apparatus in Verilog, System Verilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and System Verilog or other behavioral representations of the concepts that can be interpreted by a computer to enable simulation, functional and/or formal verification, and testing of the concepts.

Additionally, or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively, or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively, or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added, or operations can be deleted, without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A control circuit configured to receive a stream of addresses associated with cache lookup requests to a cache of a data processing system, the requests resulting from execution of a workload by the data processing system, and the control circuit comprising:
   a cache miss monitor including:
      a first counter configured to determine a number of addresses in the stream of addresses for which a corresponding lookup request resulted in a miss in the cache;
      a cardinality circuit configured to determine a number of unique addresses in the stream of addresses for which a corresponding lookup request resulted in a miss in the cache; and
      a circuit configured to determine a number of reoccurring misses as a difference between the number of addresses and the number of unique addresses;
   a cache hit monitor including:
      a moment circuit configured to determine a first frequency moment $\mu_h$ and a second frequency moment $M_h^{(2)}$ of addresses in the stream of addresses for which a corresponding lookup request resulted in a hit in the cache; and
   a controller configured to control the data processing system based on the number of reoccurring misses, the first frequency moment $\mu_h$ and the second frequency moment $M_h^{(2)}$.

2. The control circuit of claim 1, where the cardinality circuit includes a circuit configured to determine a statistical estimate of the number of unique addresses in a block of addresses of the stream of addresses and the moment circuit is configured to determine statistical estimates of the first and second frequency moments over blocks of addresses of the stream of addresses.

3. The control circuit of claim 1, where the cache hit monitor includes: an allocation circuit configured to allocate one or more addresses of the stream of addresses in a memory; a second counter configured to count a number of addresses in the stream of addresses for which the address matches an address allocated in the memory and a corresponding lookup request resulted in a hit in the cache; and a third counter configured to count a number of allocations made by the allocation circuit.

4. The control circuit of claim 1, further comprising an estimation circuit configured to determine a cache-thrashing indicator based on the number of reoccurring misses, the first frequency moment $\mu_h$ and the second frequency moment $M_h^{(2)}$, where the controller is configured to control the data processing system based on the cache-thrashing indicator.

5. The control circuit of claim 4, where the cache-thrashing indicator is also based on a ratio W/T, where T is the number of addresses in the stream of addresses for which a corresponding lookup request resulted in a miss in the cache and W is the number of reoccurring misses in the address stream.

6. The control circuit of claim 4, further comprising a cache bypass circuit configured to:
   randomly bypass the cache for a cache miss with a probability based on the cache-thrashing indicator;
   bypass the cache for a cache miss for a data address based on the data address and the cache-thrashing indicator; or
   bypass the cache for a cache miss for a data address based on a hash of the data address and the cache-thrashing indicator.

7. The control circuit of claim 4, further comprising:
   a working set size estimator configured to monitor the address stream and generate a statistical estimate of a size of a working set of the cache,
   where the controller is further configured to control a bypass mechanism of the cache to:
   bypass allocations in the cache based on the number of reoccurring misses, the first frequency moment $\mu_h$ and the second frequency moment $M_h^{(2)}$; and
   bypass the cache based on the statistical estimate of the size of the working set of the cache.

8. The control circuit of claim 1, where the cache hit monitor includes:
   a memory configured to store a set of R frequency counts, where a frequency count c(i) at location i in the memory is associated with an address a(i) in a set of addresses selected from the stream of addresses;
   a replacement circuit configured to:
      replace an address in the set of addresses with a current address in the stream of addresses based on a designated probability, and
      set frequency count c(i) to one when the address associated with frequency count c(i) addresses is replaced;
   a memory update circuit configured to increment the frequency count c(i) stored in the memory when an associated addresses a(i) in the set of addresses occurs in the stream of cache lookup addresses and a corresponding cache lookup is a miss in the cache; and
   an accumulator update circuit configured to update one or more accumulator values based on the frequency counts;
   where the moment circuit is configured to determine the first and second frequency moments based on the accumulated values.

9. The control circuit of claim 8, where the accumulator update circuit is configured to:
   when an address a(i) in the set of addresses occurs in the stream of cache lookup addresses and the corresponding cache lookup is a miss in the cache:
      increment a first accumulator value $F_1$, and
      add 2×c(i)−1 to a second accumulator value $F_2$, and
   increment a sample accumulator value $F_0$ when an address in the set of addresses is replaced.

10. The control circuit of claim 9, where the moment circuit is configured to determine a second frequency moment $M_h^{(2)}$ of the address stream as $F_2/F_0$.

11. The control circuit of claim 8, where the memory includes a content address memory (CAM) configured to store the set of addresses, the CAM determining an index i in response to an address a(i).

12. The control circuit of claim 1, where the cardinality circuit includes: a memory, configured to store maximum pattern lengths; match circuitry configured to generate a first pattern match length of a first bit vector, the first bit vector corresponding to an address of the stream of addresses or a hash of an address of the stream of addresses; memory update circuitry configured to: receive a first index; compare the first pattern match length to a maximum pattern length for the first index stored in the memory; and update the maximum pattern match length for the first index in the memory with the first pattern match length when the first pattern match length is greater than the maximum pattern length for the first index; sum update circuitry configured to update a first summation value based on the maximum pattern match length for the first index and the first pattern match length when the first pattern match length is greater than the maximum pattern length for the first index; and sequential logic circuitry configured to generate a first statistical cardinality count from a scaled reciprocal of the first summation, the first statistical cardinality count indicating number of unique addresses in the stream of addresses for which a corresponding lookup request resulted in a miss in the cache.

13. The control circuit of claim 12, further comprising hash circuitry configured to generate a hash value from an address of the stream of addresses, the hash value including the first index and the first bit vector.

14. The control circuit of claim 1, where the controller is configured to control a bypass mechanism of the cache, a partitioning of the cache, or an allocation of the workload.

15. The control circuit of claim 1, where the moment circuit of the cache hit monitor is configured to determine the first frequency moment $\mu_h$ from the stream of addresses and to determine the second frequency moment $M_h^{(2)}$ from the stream of addresses or from the first frequency moment and a variance parameter on.

16. A computer-implemented method comprising, for a sequence of cache requests in a data processing system having a cache, the sequence of cache requests resulting from execution of a workload by the data processing system:
  determining an average reoccurring miss frequency $\mu_m$ of addresses in the sequence of cache requests based on a total number of addresses in the sequence and a number of unique addresses in the sequence;
  determining a first frequency moment $\mu_h$ and a second frequency moment $M_h^{(2)}$ of sample addresses in the sequence of the cache requests that resulted in a hit in the cache; and
  controlling the data processing system based on the average reoccurring miss frequency $\mu_m$, the first frequency moment $\mu_h$ and the second frequency moment $M_h^{(2)}$.

17. The computer-implemented method of claim 16, where determining the average reoccurring miss frequency $\mu_m$ includes:
  estimating an average number of misses between new reoccurring misses; and
  determining the average reoccurring miss frequency $\mu_m$ as a function of the average number of misses between new reoccurring misses.

18. The computer-implemented method of claim 16, further comprising
  increasing a cache-thrashing indicator based on the average reoccurring miss frequency $\mu_m$, and
  decreasing the cache-thrashing indicator based on the first frequency moment $\mu_h$ and a second frequency moment $M_h^{(2)}$;
where controlling the data processing system includes controlling at least one of:
  a bypass mechanism of the cache,
  a partitioning of the cache, and
  allocation of the workload,
based on the cache-thrashing indicator.

19. The computer-implemented method of claim 18, where decreasing the cache-thrashing indicator based on the first frequency moment $\mu_h$ and the second frequency moment $M_h^{(2)}$ includes determining a probability that a reoccurring miss can be allocated in the cache in place of a low activity or dead cache block.

20. A non-transitory computer-readable medium storing computer-readable code for fabrication of a control circuit comprising:
  a cache miss monitor including:
    a first counter configured to determine a number of addresses in a stream of addresses associated with cache lookup requests to a cache for which a corresponding lookup request resulted in a miss in the cache, the lookup requests resulting from execution of a workload in a data processing system;
    a cardinality circuit configured to determine a number of unique addresses in the stream of addresses for which a corresponding lookup request resulted in a miss in the cache; and
    a circuit configured to determine a number of reoccurring misses as a difference between the number of addresses and the number of unique addresses;
  a cache hit monitor including:
    a moment circuit configured to determine a first frequency moment $\mu_h$ and a second frequency moment $M_h^{(2)}$ of addresses in the stream of addresses for which a corresponding lookup request resulted in a hit in the cache; and
  an estimation circuit configured to determine a cache-thrashing indicator based on the number of reoccurring misses, the first frequency moment $\mu_h$ and the second frequency moment $M_h^{(2)}$.

* * * * *